(12) United States Patent
Tanaka et al.

(10) Patent No.: US 12,536,971 B2
(45) Date of Patent: Jan. 27, 2026

(54) DISPLAY DEVICE AND DISPLAY SYSTEM

(71) Applicant: Magnolia White Corporation, Tokyo (JP)

(72) Inventors: Hitoshi Tanaka, Tokyo (JP); Gen Koide, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 0 days.

(21) Appl. No.: 18/804,773

(22) Filed: Aug. 14, 2024

(65) Prior Publication Data

US 2025/0060811 A1 Feb. 20, 2025

(30) Foreign Application Priority Data

Aug. 18, 2023 (JP) ................. 2023-133638

(51) Int. Cl.
*G09G 3/36* (2006.01)
*G02B 27/01* (2006.01)
(Continued)

(52) U.S. Cl.
CPC ....... *G09G 3/3674* (2013.01); *G02B 27/0172* (2013.01); *G06F 3/011* (2013.01); *G06T 19/006* (2013.01); *G09G 3/3266* (2013.01); *G09G 3/3607* (2013.01); *G09G 3/3611* (2013.01); *G09G 3/3677* (2013.01); *G02B 2027/0178* (2013.01); *G09G 2300/0426* (2013.01);
(Continued)

(58) Field of Classification Search
CPC ................ G06F 3/011; G02B 27/0172; G02B 2027/0178; G06T 19/006; G09G 3/3266; G09G 3/3607; G09G 3/3611; G09G 3/3674; G09G 3/3677; G09G 2300/0426; G09G 2310/02; G09G 2310/0202; G09G 2310/0264; G09G 2310/0281; G09G 2310/0283
USPC ............................................................ 345/8
See application file for complete search history.

(56) References Cited

U.S. PATENT DOCUMENTS 7,253,865 B2 * 8/2007 Battersby ............ G02F 1/13336
257/E33.032
9,626,900 B2 * 4/2017 Anzai .................. G09G 3/2096
(Continued)

FOREIGN PATENT DOCUMENTS

| JP | 2017-511041 A | 4/2017 |
| JP | 2021-063897 A | 4/2021 |
| WO | WO2021/200650 A1 | 10/2021 |

*Primary Examiner* — Jason M Mandeville
(74) *Attorney, Agent, or Firm* — K&L Gates LLP

(57) ABSTRACT

According to an aspect, a display device includes: a display region provided with pixels, scan lines extending in a first direction, and signal lines extending in a second direction; a peripheral region located between ends of the substrate and the display region; a first scan line drive circuit disposed in the peripheral region; a second scan line drive circuit disposed in the peripheral region opposite the first scan line drive circuit; a third scan line drive circuit disposed in the peripheral region opposite the first scan line drive circuit; a signal line coupling circuit disposed in the peripheral region; and a driver IC disposed in the peripheral region. The second and third scan line drive circuits are adjacent to each other. More than one of the scan lines coupled to the second scan line drive circuit passes through the third scan line drive circuit and extends to the display region.

19 Claims, 24 Drawing Sheets

(51) Int. Cl.
*G06F 3/01* (2006.01)
*G06T 19/00* (2011.01)
*G09G 3/3266* (2016.01)

(52) U.S. Cl.
CPC . *G09G 2310/02* (2013.01); *G09G 2310/0202* (2013.01); *G09G 2310/0264* (2013.01); *G09G 2310/0281* (2013.01); *G09G 2310/0283* (2013.01)

(56) References Cited

U.S. PATENT DOCUMENTS

| | | | |
|---|---|---|---|
| 10,409,103 B2* | 9/2019 | Katsuta | G02F 1/1345 |
| 10,535,319 B2* | 1/2020 | Chen | G09G 5/003 |
| 10,928,695 B1* | 2/2021 | Chen | G02F 1/133723 |
| 12,107,091 B2* | 10/2024 | Watanabe | G02F 1/136286 |
| 12,223,922 B2* | 2/2025 | Tanaka | G09G 3/3648 |
| 2008/0018557 A1* | 1/2008 | Maeda | G02F 1/167 345/55 |
| 2010/0013853 A1* | 1/2010 | Takatori | G06F 3/14 345/611 |
| 2015/0234189 A1 | 8/2015 | Lyons | |
| 2015/0234192 A1 | 8/2015 | Lyons | |
| 2015/0234193 A1 | 8/2015 | Lyons | |
| 2015/0234501 A1 | 8/2015 | Lyons | |
| 2015/0235426 A1 | 8/2015 | Lyons | |
| 2016/0253006 A1 | 9/2016 | Lyons | |
| 2016/0334628 A1 | 11/2016 | Lyons | |
| 2017/0255019 A1 | 9/2017 | Lyons | |
| 2019/0027092 A1* | 1/2019 | Matsueda | H10K 59/122 |
| 2019/0265488 A1 | 8/2019 | Lyons | |
| 2021/0109412 A1 | 4/2021 | Suzumura et al. | |
| 2021/0367122 A1* | 11/2021 | Park | H10H 20/857 |
| 2023/0014991 A1 | 1/2023 | Watanabe | |
| 2023/0026937 A1 | 1/2023 | Suzumura et al. | |
| 2024/0142836 A1 | 5/2024 | Suzumura et al. | |

* cited by examiner

DISPLAY DEVICE AND DISPLAY SYSTEM

CROSS-REFERENCE TO RELATED APPLICATION

This application claims the benefit of priority from Japanese Patent Application No. 2023-133638 filed on Aug. 18, 2023, the entire contents of which are incorporated herein by reference.

BACKGROUND

1. Technical Field

What is disclosed herein relates to a display device and a display system.

2. Description of the Related Art

A virtual reality (VR) system stereoscopically displays a three-dimensional object and gives a user a sense of virtual reality by changing the display of the stereoscopic image as a point of view moves. For example, Japanese Translation of PCT International Application Publication No. 2017-511041 discloses a display system that allows an image to be visible on a display device through two lenses.

WO 2021/200650 discloses a display device and a display system that improve the sense of an image resolution and prevent deterioration of image visibility even when the image is viewed through one pair of lenses. Japanese Patent Application Laid-open Publication No. 2021-063897 (JP-A-2021-063897) discloses a high-definition display device.

In the display system disclosed in WO 2021/200650, the scan lines are driven by the first and second scan line drive circuits. In FIGS. 11, 17, and 18 in WO 2021/200650, the scan lines are inclined with respect to the first direction, whereby the second scan line drive circuit is more displaced in the second direction than the first scan line drive circuit. As in the case of the high-definition display device disclosed in JP-A-2021-063897, when the number of scan lines is increased, the area of the peripheral region is also increased.

For the foregoing reasons, there is a need for a display device and a display system that reduce an area of a peripheral region.

SUMMARY

According to an aspect, a display device includes: a substrate; a display region that has a shape of a polygon with five or more sides, is provided to the substrate, and is provided with a plurality of pixels, a plurality of scan lines extending in a first direction, and a plurality of signal lines extending in a second direction; a peripheral region that is provided to the substrate and located between ends of the substrate and the display region; a first scan line drive circuit that is disposed in the peripheral region and coupled to the scan lines; a second scan line drive circuit that is disposed in the peripheral region opposite the first scan line drive circuit across the display region, and coupled to the scan lines; a third scan line drive circuit that is disposed in the peripheral region opposite the first scan line drive circuit with the display region therebetween, and coupled to the scan lines; a signal line coupling circuit that is disposed in the peripheral region and coupled to the signal lines; and a driver integrated circuit (IC) that is disposed in the peripheral region and configured to control the first scan line drive circuit, the second scan line drive circuit, the third scan line drive circuit, and the signal line coupling circuit. The second scan line drive circuit and the third scan line drive circuit are adjacent to each other. More than one of the scan lines coupled to the second scan line drive circuit passes through the third scan line drive circuit and extends to the display region.

According to an aspect, a display system includes a lens, the display device, and a control device that outputs an image to the display device.

DETAILED DESCRIPTION

Figure 1:
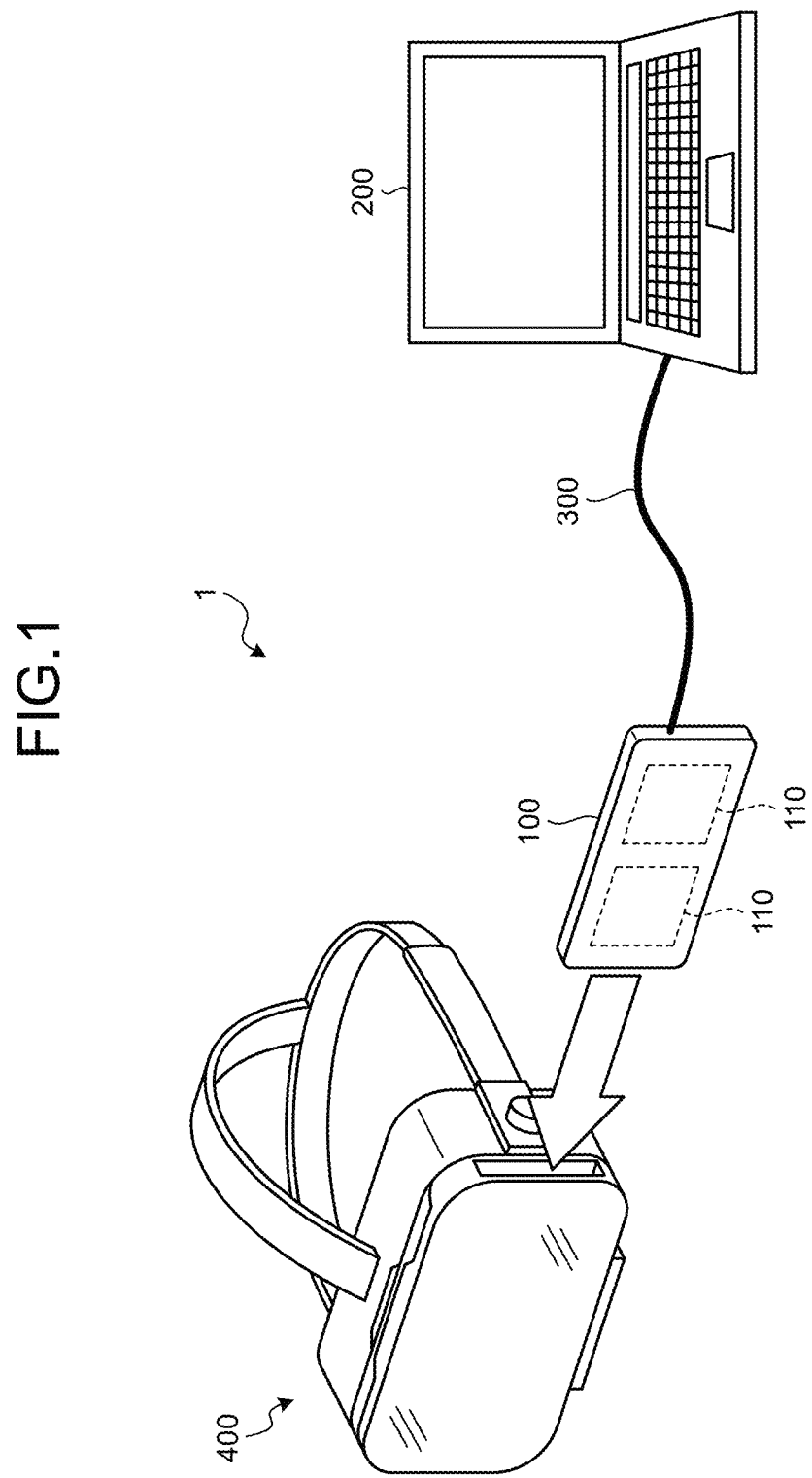
FIG. 1 is a configuration diagram illustrating an example of a display system according to a first embodiment.

The following describes embodiments of the present invention in detail with reference to the accompanying drawings. The present disclosure is not limited to the descriptions of the embodiments given below. Components described below include those easily conceivable by those skilled in the art or those substantially identical thereto. In addition, the components described below can be combined as appropriate. What is disclosed herein is merely an example, and the present disclosure naturally encompasses appropriate modifications easily conceivable by those skilled in the art while maintaining the gist of the invention. To further clarify the description, the drawings schematically illustrate, for example, widths, thicknesses, and shapes of various parts as compared with actual aspects thereof, in some cases. However, they are merely examples, and interpretation of the present disclosure is not limited thereto. The same element as that illustrated in a drawing that has already been discussed is denoted by the same reference numeral through the description and the drawings, and detailed description thereof will not be repeated in some cases where appropriate.

In this disclosure, when an element is described as being "on" another element, the element can be directly on the other element, or there can be one or more elements between the element and the other element.

First Embodiment

Figure 2:
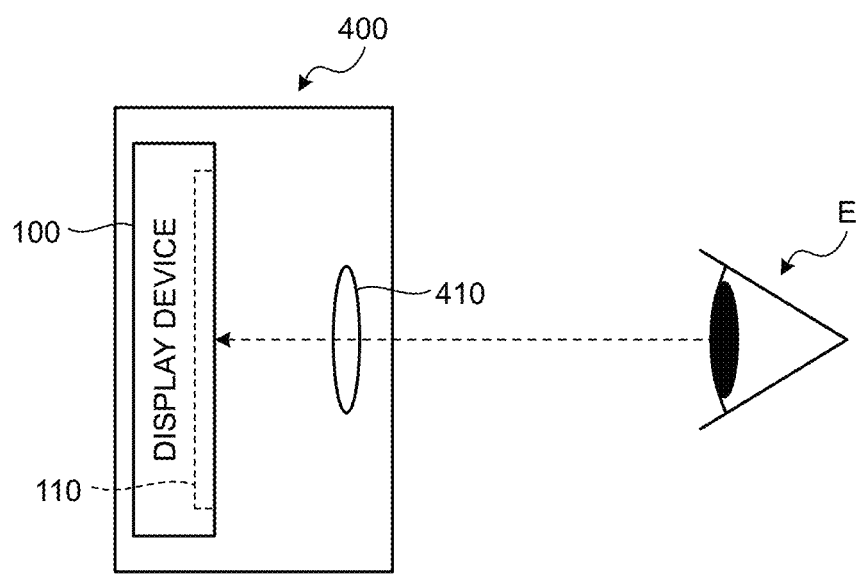
FIG. 2 is a schematic diagram illustrating an exemplary relative relation between a display device and an eye of a user.

FIG. 1 is a configuration diagram illustrating an exemplary display system according to a first embodiment. FIG. 2 is a schematic diagram illustrating an exemplary relative relation between a display device and an eye of a user.

In the first embodiment, this display system 1 changes display output as a user moves. The display system 1 is a virtual reality (VR) system that stereoscopically displays a VR image representing a three-dimensional object and the like in a virtual space and changes the stereoscopic display according to a direction (position) of the head of the user so as to cause the user to experience a sense of virtual reality, for example.

The display system 1 has a display device 100 and a control device 200, for example. The display device 100 and the control device 200 are configured to be capable of receiving and outputting information (signals) through a cable 300. Examples of the cable 300 include a universal serial bus (USB) cable and a high-definition multimedia interface (HDMI) (registered trademark) cable. The display device 100 and the control device 200 may be configured to be capable of receiving and outputting information through wireless communication.

The display device 100 is supplied with power from the control device 200 through the cable 300. The display device 100 may include a power receiver supplied with the power from a power supply of the control device 200 through the cable 300, and use the power supplied from the control device 200 to drive components such as display panels 110 and a sensor 120 of the display device 100. This configuration can eliminate a battery and the like from the display device 100 and can provide the display device 100 having a smaller weight at a lower cost. The battery may be provided in a wearable member 400 or the display device 100 and supply the power to the display device 100.

The display device 100 includes the display panels. The display panel is a liquid crystal display (LCD), for example.

The display device 100 is fixed to the wearable member 400. Examples of the wearable member 400 include a headset, goggles, a helmet, and a mask that covers the eyes of the user. The wearable member 400 is worn on the head of the user. When being worn, the wearable member 400 is disposed in front of the user so as to cover the eyes of the user. When the display device 100 fixed in the wearable member 400 is positioned in front of the eyes of the user, the wearable member 400 serves as an immersive wearable member. The wearable member 400 may include an output device for outputting, for example, a sound signal output from the control device 200. The wearable member 400 may have a structure incorporating functions of the control device 200.

The example illustrated in FIG. 1 illustrates a case where the display device 100 is slotted into the wearable member 400. The display device 100 may be fixed to the wearable member 400. In other words, the display system may consist of the control device 200 and a wearable display device that includes the wearable member 400 and the display device 100.

As illustrated in FIG. 2, the wearable member 400 includes lenses 410 corresponding to the eyes of the user, for example. The lenses 410 are magnifying lenses for forming images in the eyes of the user. When the wearable member 400 is worn on the head of the user, the lenses 410 are positioned in front of eyes E of the user. The user views display regions of the display device 100 magnified by the lenses 410. Therefore, the display device 100 needs to have a high resolution to clearly display the images (screens). In the present disclosure, the description has been made by exemplifying one pair of the lenses. However, for example, a plurality of pairs of lenses may be provided, and the display device 100 may be disposed in a position different from the front of the eyes.

The control device 200 displays an image on the display device 100, for example. For example, an electronic apparatus such as a personal computer or a game console can be used as the control device 200. Examples of a virtual image include images such as a computer graphic video and a 360-degree live action video. The control device 200 outputs a three-dimensional image obtained by using parallax between the eyes of the user to the display device 100. The control device 200 outputs, to the display device 100, images for the right eye and the left eye that follow the change in direction of the head of the user.

Figure 3:
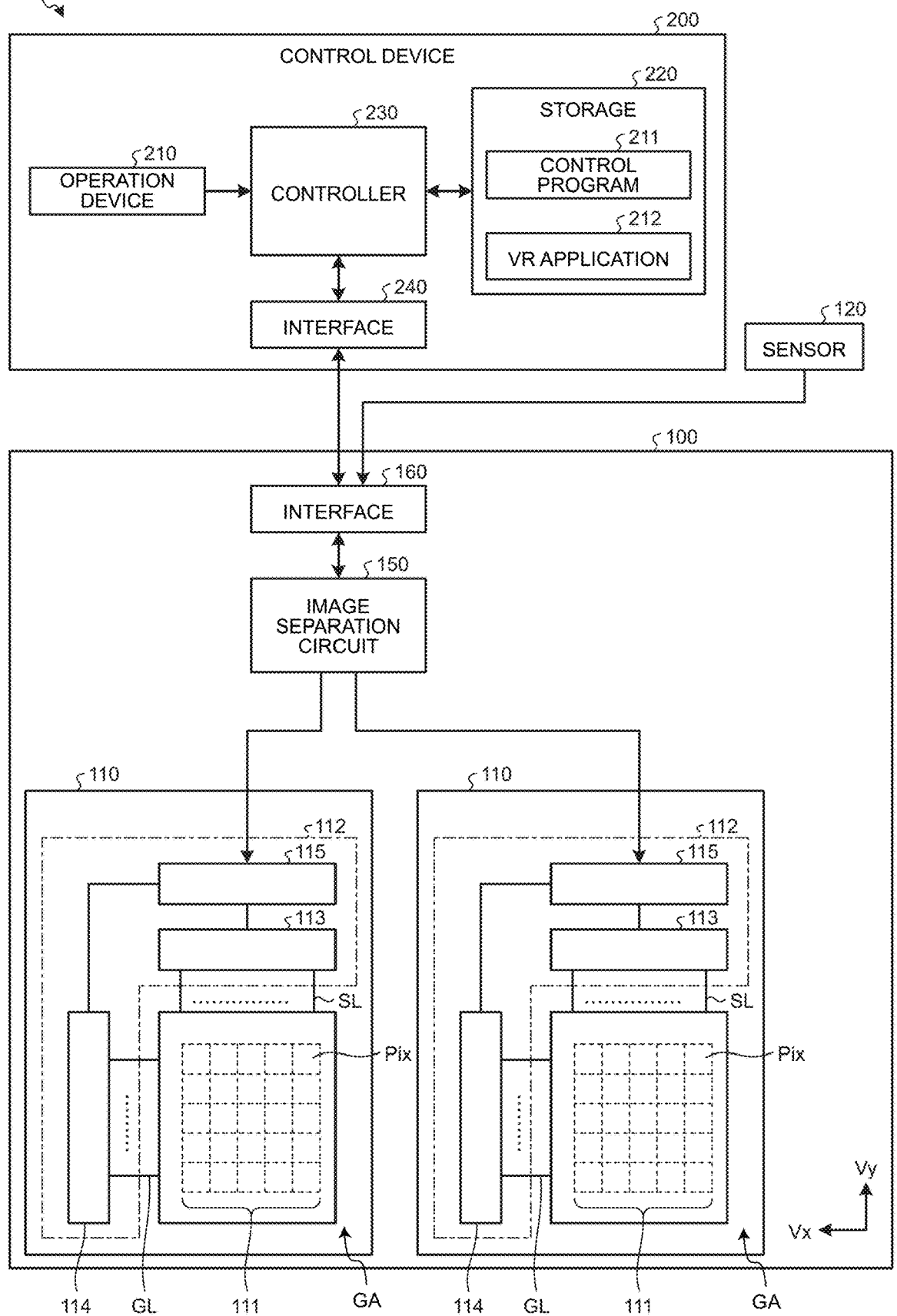
FIG. 3 is a block diagram illustrating an exemplary configuration of the display system according to the first embodiment.

FIG. 3 is a block diagram illustrating an exemplary configuration of the display system according to the first embodiment. As illustrated in FIG. 3, the display device 100 includes the two display panels 110, the sensor 120, an image separation circuit 150, and an interface 160.

The display device 100 includes the two display panels 110, one of which is used for the left eye, and the other of which is used for the right eye.

Each of the two display panels 110 has a display region 111 and a display control circuit 112. The display panel 110 has an unillustrated light source device that irradiates the display region 111 from behind.

Figure 10:
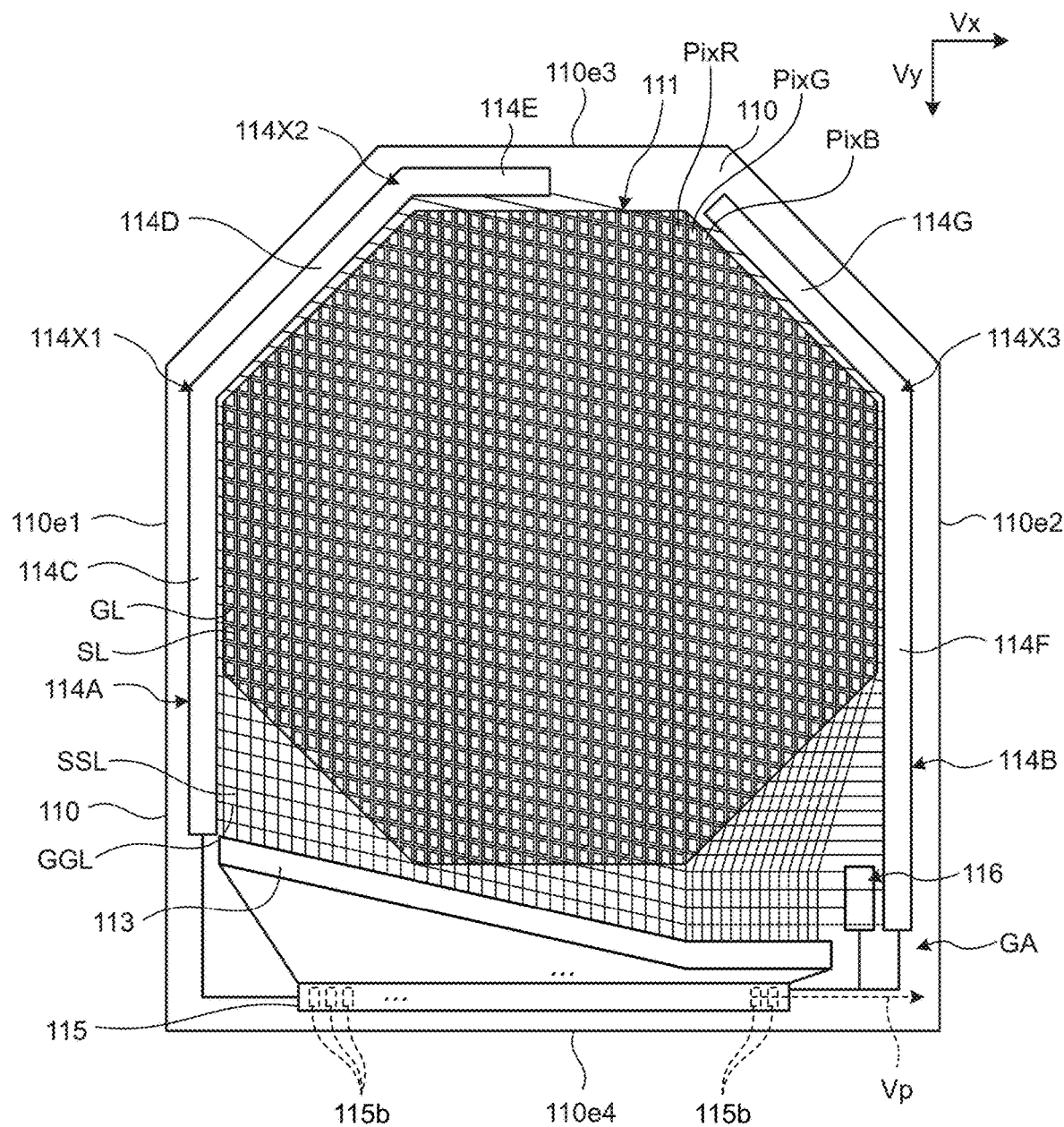
FIG. 10 is a schematic diagram illustrating an example of the display region according to the first embodiment.

In the display region 111, $P_0 \times Q_0$ pixels Pix ($P_0$ pixels in the row direction and $Q_0$ pixels in the column direction) are arranged in a two-dimensional matrix having a row-column configuration. In the first embodiment, $P_0=2880$, and $Q_0=1700$. FIG. 3 schematically illustrates the arrangement of the pixels Pix. The detailed arrangement of the pixels Pix is described later. The pixels of the display device are viewed through the lens, which requires the pixel pitch to be from 3 μm to 10 μm, for example. The display region 111 thus has a high-definition array of the pixels Pix. The display region 111 is surrounded by a peripheral region GA. The display region 111 has a quadrangle shape in FIG. 3, but actually has an octagonal shape as illustrated in FIG. 10.

The display panel 110 has scan lines extending in an X direction and signal lines extending in a Y direction intersecting the X direction. The display panel 110 has 2880 signal lines SL and 1700 scan lines GL, for example. In the display panel 110, the pixels Pix are arranged in regions surrounded by the signal lines SL and the scan lines GL. The pixel Pix has a switching element SW (a thin film transistor (TFT)) coupled to the signal line SL and the scan line GL, and a pixel electrode PE coupled to the switching element SW. Each of the scan lines GL is coupled to the pixels Pix arranged along the extending direction of the scan line GL. Each of the signal lines SL is coupled to the pixels Pix arranged along the extending direction of the signal line SL.

The display region 111 of one of the two display panels 110 is used for the right eye, and the display region 111 of the other of the two display panels 110 is used for the left eye. In the first embodiment, a case is described where the two display panels 110 for the right eye and the left eye are used. However, the display device 100 is not limited to the structure using the two display panels 110 as described above. For example, one display panel 110 may be used, and the display region of the one display panel 110 may be divided into two regions such that the right half region displays an image for the right eye and the left half region displays an image for the left eye.

The display control circuit 112 includes a driver integrated circuit (IC) 115, a signal line coupling circuit 113, and a scan line drive circuit 114. The signal line coupling circuit 113 is electrically coupled to the signal lines SL. The driver IC 115 causes the scan line drive circuit 114 to control on/off of the switching elements (for example, the TFTs) for controlling operations (light transmittance) of the pixels Pix. The scan line drive circuit 114 is electrically coupled to the scan lines GL. The driver IC controls the signal line coupling circuit 113 and the scan line drive circuit 114.

The sensor 120 detects information that enables determination of the direction of the head of the user. For example, the sensor 120 detects information indicating the movement of the display device 100 or the wearable member 400, and the display system 1 determines the direction of the head of the user wearing the display device 100 on the head based on the information indicating the movement of the display device 100 or the wearable member 400.

The sensor 120 detects information that enables determination of the direction of a line of sight using at least one of the angle, the acceleration, the angular velocity, the azimuth, and the distance of the display device 100 or the wearable member 400, for example. For example, a gyroscope sensor, an acceleration sensor, and/or an azimuth sensor can be used as the sensor 120. As the sensor 120, the gyroscope sensor may be used to detect the angle and the angular velocity of the display device 100 or the wearable member 400, for example. As the sensor 120, the acceleration sensor may be used to detect the direction and the magnitude of the acceleration acting on the display device 100 or the wearable member 400, for example. As the sensor 120, the azimuth sensor may be used to detect the azimuth of the display device 100, for example. As the sensor 120, a distance sensor or a global positioning system (GPS) receiver may be used to detect the movement of the display device 100 or the wearable member 400, for example. Another sensor, such as a photosensor, or a combination of a plurality of sensors may be used as the sensor 120, as long as the sensor or the combination of sensors are capable of detecting the direction of the head, a change in the line of sight, the movement, or the like of the user. The sensor 120 is electrically coupled to the image separation circuit 150 through the interface 160, which is described later.

The image separation circuit 150 receives image data for the left eye and image data for the right eye transmitted from the control device 200 through the cable 300. The image separation circuit 150 transmits the image data for the left eye to the display panel 110 that displays the image for the left eye and the image data for the right eye to the display panel 110 that displays the image for the right eye.

The interface 160 includes a connector coupled to the cable 300 (refer to FIG. 1). The interface 160 receives signals from the control device 200 through the coupled cable 300. The image separation circuit 150 outputs signals received from the sensor 120 to the control device 200 through the interface 160 and an interface 240. The signals received from the sensor 120 include the information that enables the determination of the direction of the line of sight described above. Alternatively, the signals received from the sensor 120 may be output directly to a controller 230 of the control device 200 through the interface 160. The interface 160 may be a wireless communication device, for example, and transmit and receive information to and from the control device 200 through the wireless communication.

The control device 200 includes an operation device 210, a storage 220, the controller 230, and the interface 240.

The operation device 210 receives an operation of the user. Input devices such as a keyboard, buttons, and a touchscreen can be used as the operation device 210, for example. The operation device 210 is electrically coupled to the controller 230. The operation device 210 outputs information corresponding to the operation to the controller 230.

The storage 220 stores therein a computer program and data. The storage 220 temporarily stores therein results of processing by the controller 230. The storage 220 includes a storage medium. Examples of the storage medium include a read-only memory (ROM), a random-access memory (RAM), a memory card, an optical disc, and a magneto-optical disk. The storage 220 may store therein data of the image to be displayed on the display device 100.

The storage 220 stores therein a control program 211 and a VR application 212, for example. The control program 211 can provide functions related to various types of control for operating the control device 200, for example. The VR application 212 can provide a function to display the image of the virtual reality on the display device 100. The storage 220 can store therein various types of information received from the display device 100, such as the data representing a detection result of the sensor 120, for example.

The controller 230 includes a micro control unit (MCU) or a central processing unit (CPU). The controller 230 can integrally control the operation of the control device 200. Various functions of the controller 230 are performed based on the control by the controller 230.

The controller 230 includes a graphics processing unit (GPU) that generates the image to be displayed, for example. The GPU generates the image to be displayed on the display device 100. The controller 230 outputs the image generated by the GPU to the display device 100 through the interface 240. In the first embodiment, a case will be described where the controller 230 of the control device 200 includes the GPU. The present disclosure is not limited to this case. For example, the GPU may be provided in the display device 100 or the image separation circuit 150 of the display device 100. In this case, the display device 100 only needs to acquire data from the control device 200 or an external electronic apparatus, and use the GPU to generate the image based on the data, for example.

The interface 240 includes a connector coupled to the cable 300 (refer to FIG. 1). The interface 240 receives signals from the display device 100 through the cable 300. The interface 240 outputs signals received from the controller 230 to the display device 100 through the cable 300. The interface 240 may be a wireless communication device, for example, and transmit and receive the information to and from the display device 100 through the wireless communication.

When the controller 230 executes the VR application 212, the controller 230 displays an image corresponding to the movement of the user (the display device 100) on the display device 100. When the controller 230 has detected a change in the user (the display device 100) while the image is displayed on the display device 100, the controller 230 changes the image displayed on the display device 100 to an image moved in the direction of the change. At the start of image generation, the controller 230 generates the image based on a reference point of view and a reference line of sight in the virtual space. When the controller 230 has detected the change in the user (the display device 100), the controller 230 changes the point of view or the line of sight at the time of generating the displayed image from the reference point of view or the reference line-of-sight direction to another point of view or another line of sight correspondingly to the movement of the user (display device 100), and displays an image based on the changed point of view or the changed line of sight on the display device 100.

For example, the controller 230 detects a rightward movement of the head of the user based on the detection result of the sensor 120. In this case, the controller 230 changes the image from the currently displayed image to an image obtained when the line of sight is changed rightward. The user can view the image in the rightward direction of the image displayed on the display device 100.

For example, when the controller 230 has detected a movement of the display device 100 based on the detection result of the sensor 120, the controller 230 changes the image correspondingly to the detected movement. When the controller 230 has detected that the display device 100 has moved forward, the controller 230 changes the image to an image obtained when the currently displayed image has moved forward. When the controller 230 has detected that the display device 100 has moved backward, the controller 230 changes the image to an image obtained when the currently displayed image has moved backward. The user can view the image moved in the direction of movement of the user from the image displayed on the display device 100.

Figure 4:
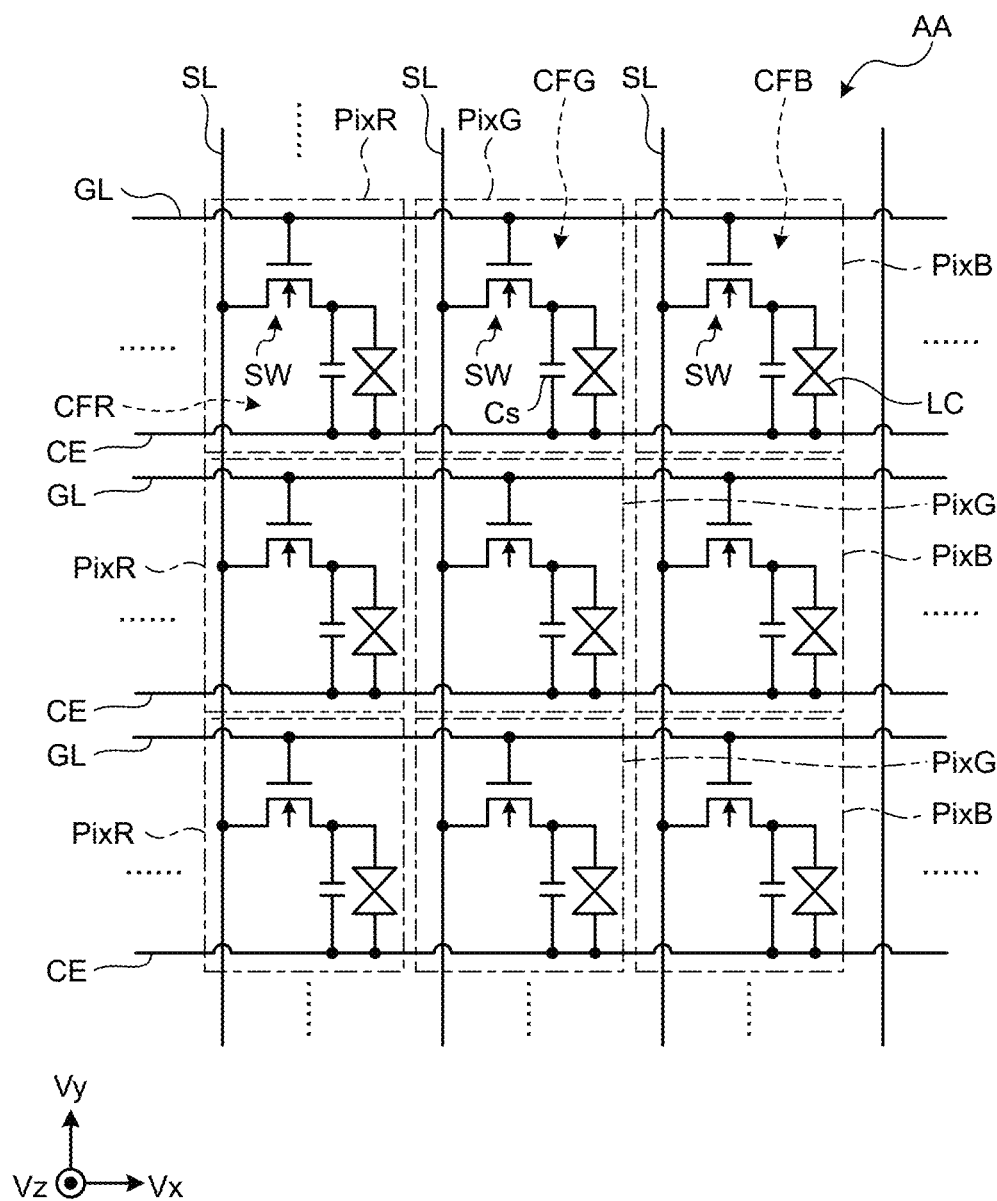
FIG. 4 is a circuit diagram illustrating a pixel array of a display region according to the first embodiment.

FIG. 4 is a circuit diagram illustrating the pixel array of the display region according to the first embodiment. In the present disclosure, the scan line GL and the signal line SL do not necessarily intersect at right angles, but in FIGS. 3, 4 and 5, the scan line GL and the signal line SL intersect at right angles for the sake of explanation.

The pixel Pix illustrated in FIG. 4 is any one of a pixel PixR, a pixel PixG, or a pixel PixB. Hereafter, the pixel PixR, the pixel PixG, and the pixel PixB is referred to as the pixel Pix when they do not need to be distinguished from one another. A display region AA illustrated in FIG. 4 is a part of the display region 111 described above.

In the display region AA, switching elements SW that are respectively included in the pixels PixR, PixG, and PixB, the signal lines SL, the scan lines GL, and the like are formed as illustrated in FIG. 4. The signal lines SL are wiring lines to supply a pixel signal to each pixel electrode PE (refer to FIG. 6). The scan lines GL are wiring lines to supply a gate signal that drives the switching elements SW.

As illustrated in FIG. 4, the pixel PixR, the pixel PixG, and the pixel PixB each have the switching element SW and a capacitance of a liquid crystal layer LC. The switching element SW, which is a thin film transistor (TFT), is an n-channel metal oxide semiconductor (MOS) TFT in this example. An insulating film, which is described later, is provided between the pixel electrodes PE and a common electrode CE. A holding capacitance Cs illustrated in FIG. 4 is formed between the pixel electrode PE and the common electrode CE.

Figure 5:
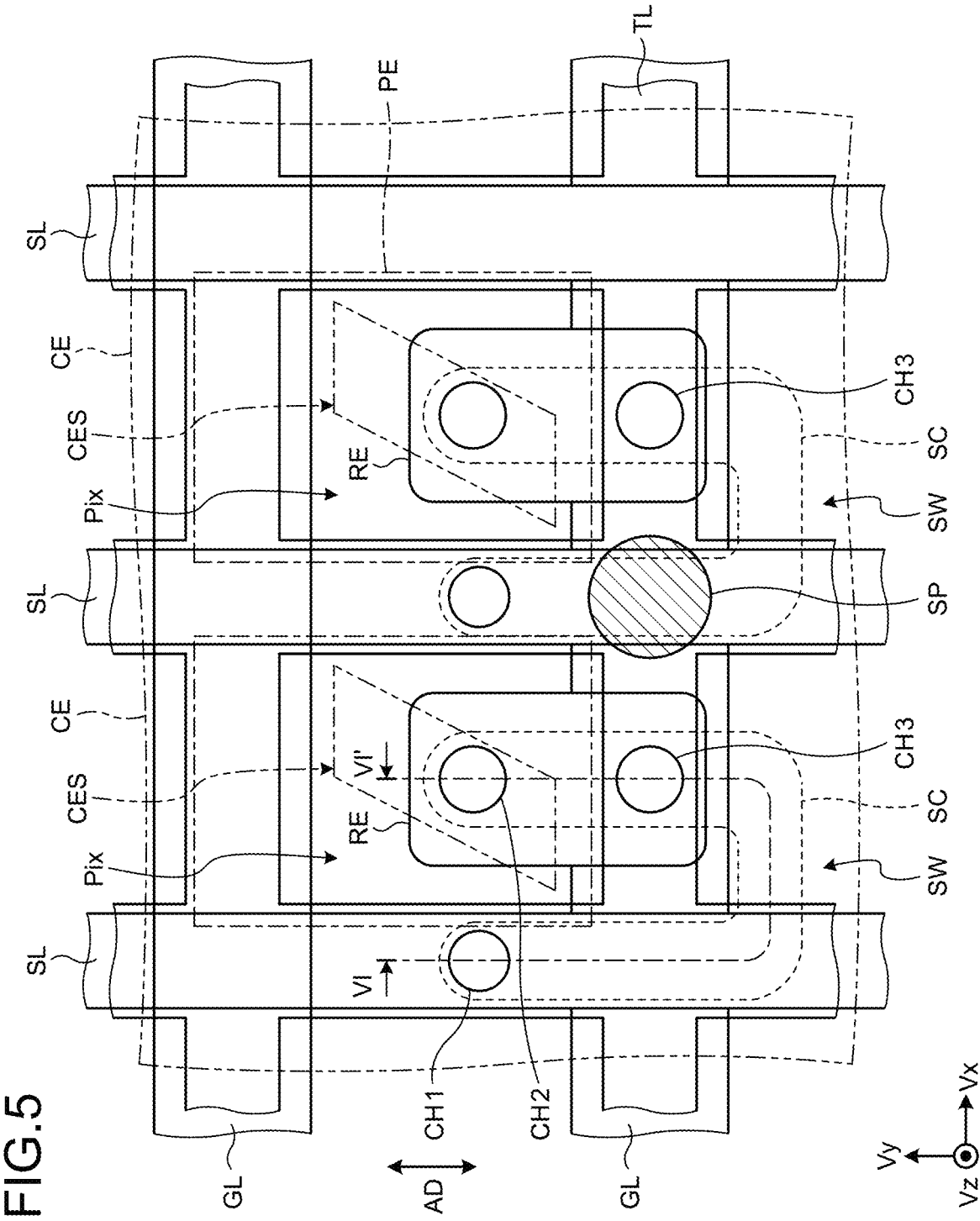
FIG. 5 is a plan view schematically illustrating an enlarged part of the display region in the first embodiment.
Figure 6:
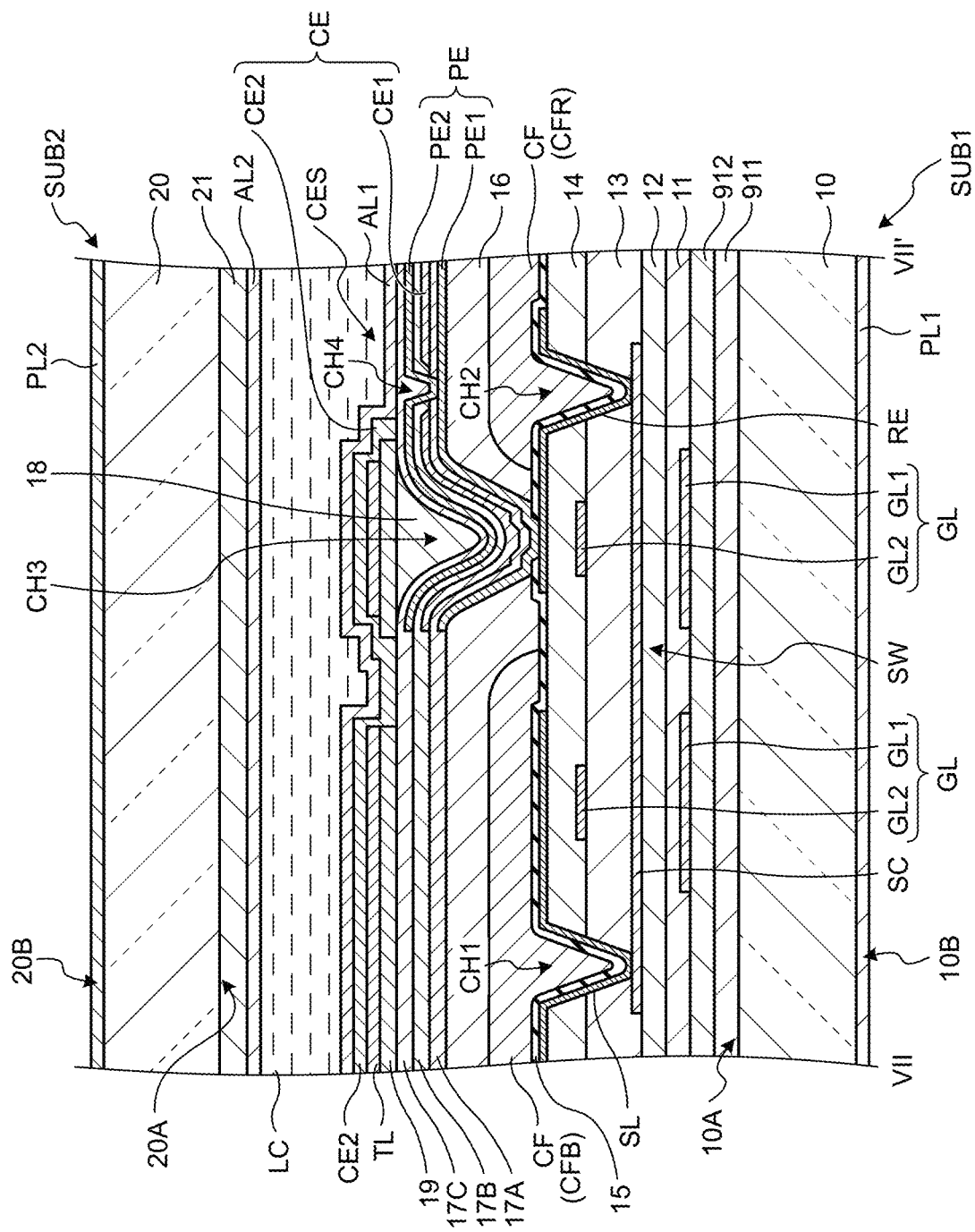
FIG. 6 is a schematic cross-sectional view taken along line VI-VI' in FIG. 5.
Figure 7:
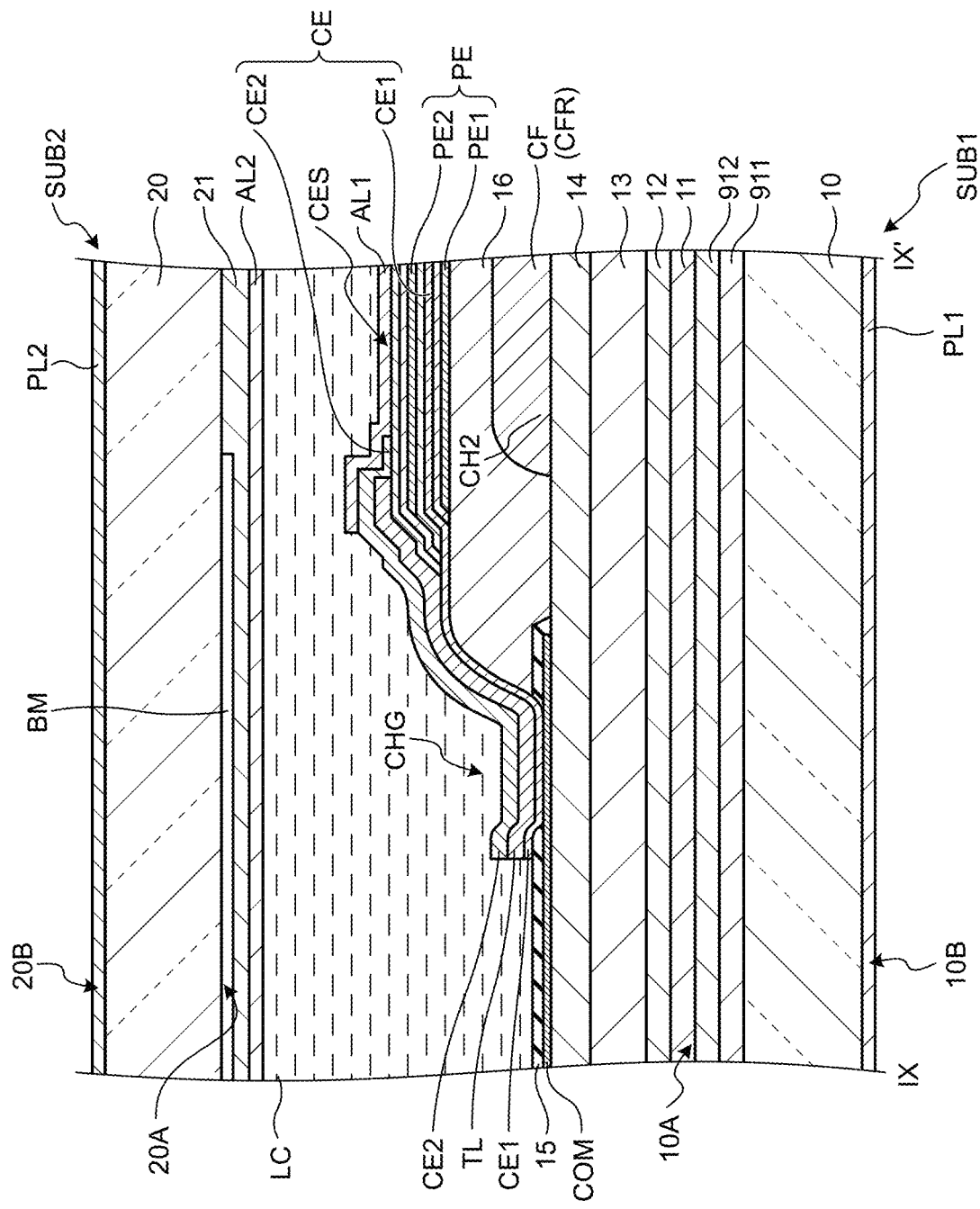
FIG. 7 is a sectional view schematically illustrating a boundary between the display region and a peripheral region according to the first embodiment.

FIG. 5 is a plan view schematically illustrating an enlarged part of the display region in the first embodiment. FIG. 6 is a schematic cross-sectional view taken along line VI-VI' in FIG. 5. FIG. 7 is a sectional view schematically illustrating a boundary between the display region and the peripheral region according to the first embodiment.

A spacer SP illustrated in FIG. 5 is a member that maintains the distance between an array substrate SUB1 and a counter substrate SUB2. The material of the spacer SP is an acrylic resin, for example. The spacer SP has a cylindrical shape. The maximum diameter of the spacer SP is illustrated in FIG. 5. The spacer SP is not limited to be formed in a cylindrical shape but may be formed in a square shape, for example. FIG. 5 exemplarily illustrates the single spacer, but actually multiple spacers are arranged.

As illustrated in FIG. 5, the signal lines SL are spaced in a direction Vx. The scan lines GL are spaced in a direction Vy. A conductive layer TL overlaps the signal lines SL and the scan lines GL in plan view and has a grid shape. The width of the conductive layer TL in the direction Vx is greater than the width of the signal line SL in the direction Vx. The width of the scan line GL in the direction Vy is greater than the width of the conductive layer TL in the direction Vy.

The pixel electrode PE and the switching element SW are arranged in an opening surrounded by two signal lines SL and two scan lines GL for each pixel Pix. The common electrode CE serves as an electrode common to the pixels Pix. The common electrode CE has a slit CES for each opening surrounded by two signal lines SL and two scan lines GL. The slit CES is a space having no light-transmitting conductive material of the common electrode CE. The slit CES overlaps the pixel electrode PE.

As illustrated in FIG. 5, a semiconductor layer SC is formed in a U-shape. As illustrated in FIG. 6, the signal line SL is electrically coupled to the semiconductor layer SC through a contact hole CH1. The semiconductor layer SC is electrically coupled to a relay electrode RE through a contact hole CH2. As illustrated in FIG. 6, the relay electrode RE is electrically coupled to the pixel electrode PE through a contact hole CH3.

In the first embodiment, color filters CF are provided to the array substrate SUB1, as illustrated in FIGS. 6 and 7. The display device 100 has what is called a color filter on array (COA) structure in which the color filter CF, the pixel electrode PE, and the common electrode CE are arranged on the array substrate SUB1.

As illustrated in FIGS. 6 and 7, the array substrate SUB1 has a first insulating substrate 10 having a light-transmitting property, such as a glass or resin substrate, as a base. The scan line GL illustrated in FIG. 5 has a gate electrode GL1 and a gate electrode GL2. The array substrate SUB1 is provided with the gate electrode GL1 of the scan line GL, a first insulating film 11, a second insulating film 12, a third insulating film 13, the gate electrode GL2 of the scan line GL, a fourth insulating film 14, the color filters CF, a fifth insulating film 15, a pixel electrode PE1, a sixth insulating film 16, a common electrode CE1, a seventh insulating film 17, a pixel electrode PE2, a first planarizing film 18, a second planarizing film 19, the conductive layer TL, a common electrode CE2, a first orientation film AL1, and the like, on the side of the first insulating substrate 10, a first base insulating film 911, and a second base insulating film 912 facing the counter substrate SUB2. In the following description, the direction from the array substrate SUB1 toward the counter substrate SUB2 is referred to as "upper side" or simply "above".

The first base insulating film 911 is located on an inner surface 10A of the first insulating substrate 10. The second base insulating film 912 is located on the first base insulating film 911. The gate electrode GL1 of the scan line GL is located on the second base insulating film 912. The first insulating film 11 is located above the gate electrode GL1 of the scan line GL and on the second base insulating film 912. The second insulating film 12 is located on the first insulating film 11. The semiconductor layer SC is located on the second insulating film 12. The third insulating film 13 is located on the semiconductor layer SC and the second insulating film 12. The gate electrode GL2 of the scan line GL is located on the third insulating film 13.

The fourth insulating film 14 is located on the gate electrode GL2 of the scan line GL and the third insulating film 13. The contact hole CH1 is formed by making a hole in the third insulating film 13 and the fourth insulating film 14 at a position overlapping the semiconductor layer SC. The signal line SL formed on the fourth insulating film 14 is electrically coupled to the semiconductor layer SC through the contact hole CH1.

The contact hole CH2 is formed by making a hole in the third insulating film 13 and the fourth insulating film 14 at a position overlapping the semiconductor layer SC. The relay electrode RE formed on the fourth insulating film 14 is electrically coupled to the semiconductor layer SC through the contact hole CH2.

The fifth insulating film 15 is located on the signal line SL, the relay electrode RE, and the fourth insulating film 14. The color filters CF are located on the fifth insulating film 15. The sixth insulating film 16 is located on the color filters CF and the fifth insulating film 15.

As illustrated in FIG. 6, the contact hole CH3 is formed by making a hole in the fifth insulating film 15 and the sixth insulating film 16 at a position overlapping the relay electrode RE. The pixel electrode PE1 is electrically coupled to the relay electrode RE through the contact hole CH3. A first intermediate insulating film 17A is located on the sixth insulating film 16 and the pixel electrode PE1. The pixel electrode PE1 is formed of a light-transmitting conductive material such as indium tin oxide (ITO), indium zinc oxide (IZO), or indium gallium oxide (IGO).

The common electrode CE1 is located on the first intermediate insulating film 17A. The common electrode CE1 is formed of a light-transmitting conductive material such as ITO, IZO, or IGO. A second intermediate insulating film 17B is located on the common electrode CE1 and the first intermediate insulating film 17A. The pixel electrode PE2 is located on the second intermediate insulating film 17B. The pixel electrode PE2 is formed of a light-transmitting conductive material such as ITO, IZO, or IGO. A contact hole CH4 is formed in the second intermediate insulating film 17B. While the second intermediate insulating film 17B electrically insulates the pixel electrode PE2 from the common electrode CE1, the pixel electrode PE2 is electrically conducted with the pixel electrode PE1 through the contact hole CH4.

A third intermediate insulating film 17C is located on the pixel electrode PE2 and the second intermediate insulating film 17B. The first intermediate insulating film 17A, the second intermediate insulating film 17B, and the third intermediate insulating film 17C are included in the seventh insulating film 17.

A recess on the surface of the third intermediate insulating film 17C is formed in the contact hole CH3. The recess is planarized by the first planarizing film 18. The second planarizing film 19 is located on the third intermediate insulating film 17C and the first planarizing film 18.

The first planarizing film 18 is formed of novolac resin or acrylic resin. The second planarizing film 19 can be formed of the same material as the first planarizing film 18 or a different material from that of the first planarizing film 18. The second planarizing film 19 is an inorganic insulating film such as silicon nitride or an organic insulating film such as novolac resin or acrylic resin, for example.

The conductive layer TL is located on the second planarizing film 19. The conductive layer TL is a metal conductor and is electrically coupled to the common electrode CE. The resistance value per unit area of each of the common electrode CE and conductive layer TL is thus small. The conductive layer TL may be a single layer of metal such as aluminum (Al), for example, or it may be formed with multiple metal layers. For example, the multiple metal layers may be layers of aluminum and titanium (Ti), in which the layer of aluminum is interposed between the upper and lower layers of titanium, that is, titanium/aluminum/titanium; or may be layers of aluminum and molybdenum (Mo), in which the layer of aluminum is interposed between the upper and lower layers of molybdenum, that is, molybdenum/aluminum/molybdenum. The conductive layer TL has a light-blocking property caused by thin film interference.

The common electrode CE2 is located on the conductive layer TL and the second planarizing film 19. The common electrode CE2 and the slit CES are covered by the first orientation film AL1.

The counter substrate SUB2 has a second insulating substrate 20 having a light-transmitting property, such as a glass or resin substrate, as a base. The counter substrate SUB2 is provided with an overcoat layer 21 and a second orientation film AL2 on the side of the second insulating substrate 20 facing the array substrate SUB1.

The array substrate SUB1 and the counter substrate SUB2 are arranged such that the first orientation film AL1 and the second orientation film AL2 face each other. The liquid crystal layer LC is sealed between the first orientation film AL1 and the second orientation film AL2. The first orientation film AL1 and the second orientation film AL2 cause the liquid crystal molecules to be oriented such that their long axes are parallel to an initial orientation direction AD illustrated in FIG. 5. The liquid crystal layer LC consists of a negative-type liquid crystal material having a negative dielectric constant anisotropy or a positive-type liquid crystal material having a positive dielectric constant anisotropy.

The array substrate SUB1 faces a backlight unit. The counter substrate SUB2 is located on a display side. Various types of backlight units are applicable as the backlight, but a detailed description of their structures is omitted.

A first optical element including a first polarizer PL1 is disposed on an outer surface 10B of the first insulating substrate 10 or on the surface facing the backlight unit. A second optical element including a second polarizer PL2 is disposed on an outer surface 20B of the second insulating substrate 20 or on the surface on an observation position side. A first polarizing axis of the first polarizer PL1 and a second polarizing axis of the second polarizer PL2 are in the crossed Nicols position in the Vx-Vy plane, for example. The first and second optical elements may include other optical functional elements such as retardation plates.

For example, when the liquid crystal layer LC is a negative liquid crystal material and no voltage is applied to the liquid crystal layer LC, liquid crystal molecules LM are initially oriented in the Vx-Vy plane such that their long axes are parallel to a predetermined direction. When a voltage is applied to the liquid crystal layer LC, that is, when the liquid crystal layer LC is in an on state in which an electric field is formed between the pixel electrode PE and the common electrode CE, the liquid crystal molecules LM are affected by the electric field and their orientation state changes. When linearly polarized light is incident in the liquid crystal layer LC in the on state, the polarization state thereof changes according to the orientation state of the liquid crystal molecules LM while the linearly polarized light passes through the liquid crystal layer LC.

As illustrated in FIG. 7, in the peripheral region GA, a wiring line COM supplying a common potential is located on the fourth insulating film 14. The fifth insulating film 15 covers and protects the wiring line COM. A contact hole CHG is provided in a part of the fifth insulating film 15, and the wiring line COM is electrically coupled, through the contact hole CHG, to the common electrode CE1, the conductive layer TL, and the common electrode CE2 that are extended from the display region AA.

As illustrated in FIG. 7, in the peripheral region GA, a light-blocking layer BM is provided to the counter substrate SUB2, and the light-blocking layer BM can hide the peripheral region GA of the array substrate SUB1. As illustrated in FIG. 6, in the display region AA, no light-blocking layer BM is provided to the counter substrate SUB2. The light-blocking layer BM is formed of a resin material colored in black.

In the COA structure of the first embodiment illustrated in FIG. 6, the display region AA of the counter substrate SUB2 does not have the color filters CF and the light-blocking layer at the boundary between the colors of the color filters CF. Consequently, the opening of the pixel Pix is not shielded from light, although the pixel Pix is small.

The display device 100 has the array substrate SUB1 and the counter substrate SUB2 facing the array substrate SUB1. No light-blocking layer is provided in the display region AA of the counter substrate SUB2. This reduces the effect of overlap misalignment between the array substrate SUB1 and the counter substrate SUB2.

Figure 8:
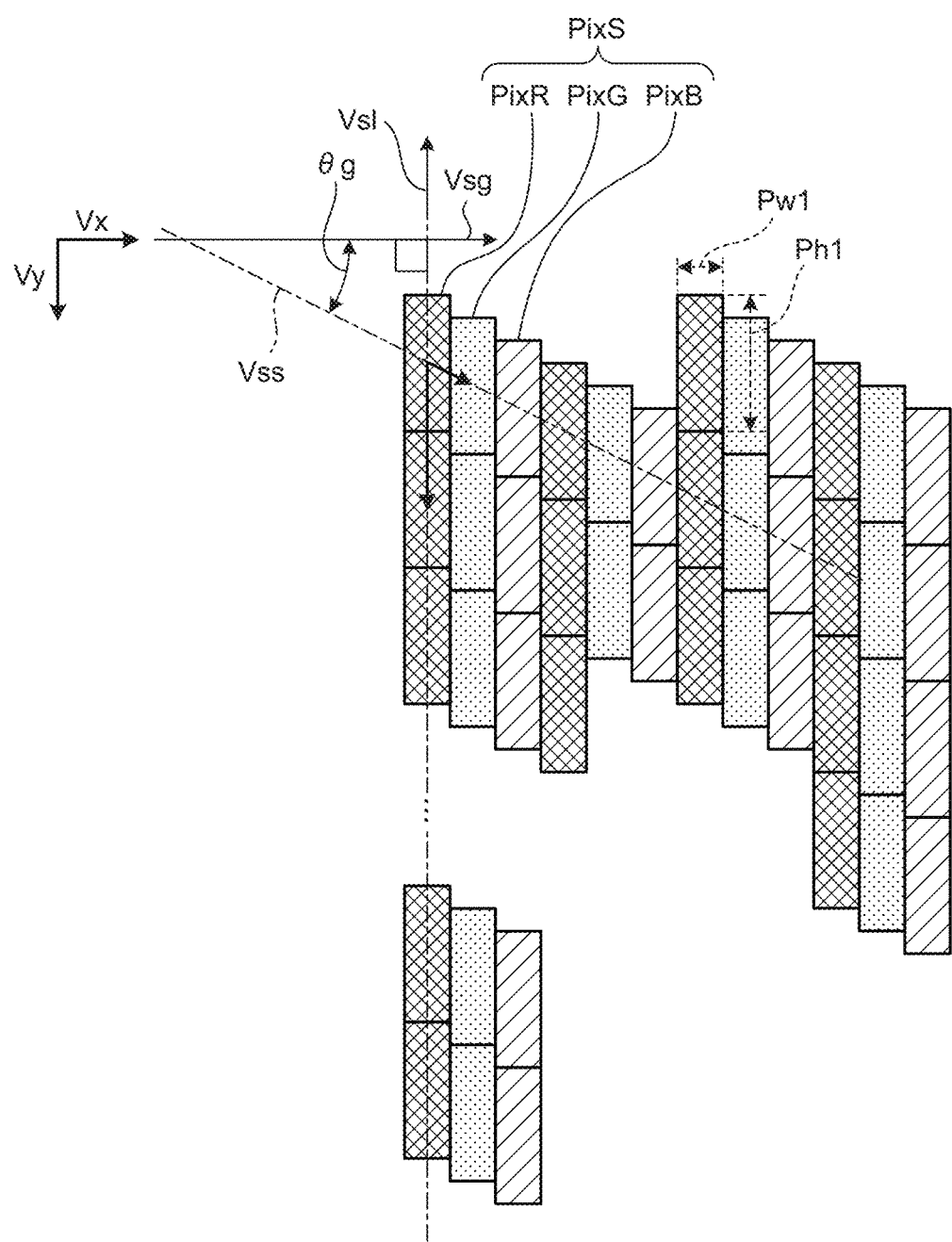
FIG. 8 is a schematic diagram explaining the inclination of the pixel arrangement in the first embodiment.
Figure 9:
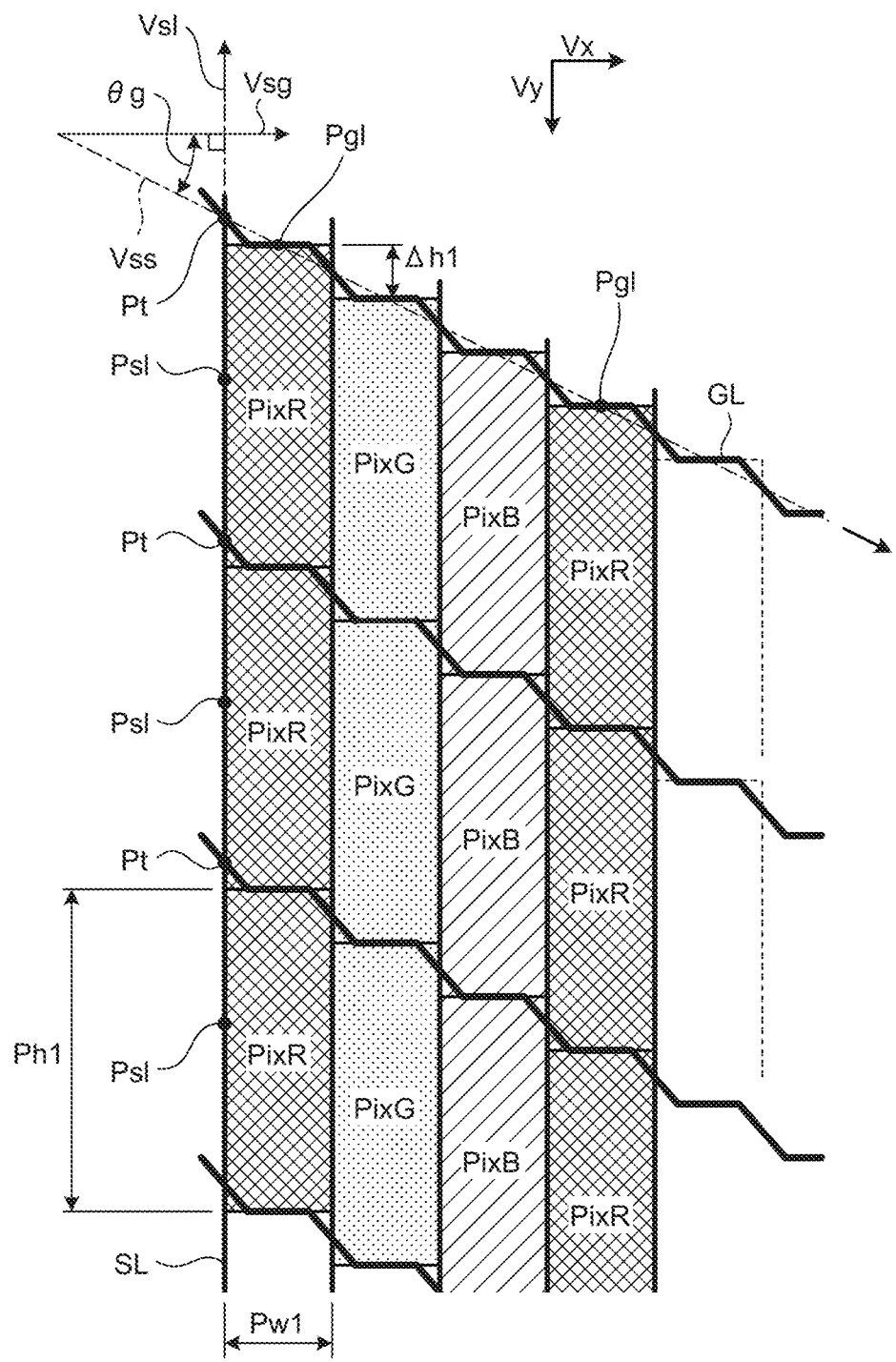
FIG. 9 is a schematic diagram illustrating a relation between signal lines and scan lines.

FIG. 8 is a schematic diagram explaining the inclination of the pixel arrangement in the first embodiment. FIG. 9 is a schematic diagram illustrating a relation between the signal lines and the scan lines in FIG. 8.

As illustrated in FIG. 8, the direction in which the signal lines SL extend is parallel to the direction Vy. The direction in which the scan lines GL extend is parallel to neither the direction Vx nor the direction Vy. The direction in which the scan lines GL extend is non-orthogonal to the direction in which the signal lines SL extend. Each of the pixels PixR, PixG, and PixB thus has a parallelogram shape, for example.

For example, as illustrated in FIG. 8, the pixels PixR, PixG, and PixB are arranged so as to be offset from one another in the direction Vy. When a distance Pw1 denotes the length in the direction Vx of each of the pixels PixR, PixG, and PixB and a distance Ph1 denotes the length in the direction Vy of each of the pixels PixR, PixG, and PixB, a relation holds that Pw1:Ph1=1:3. The pixels PixR, PixG, and PixB may each be referred to as a sub-pixel PixS.

In FIG. 8, a direction Vsl is a direction in which the signal lines SL (refer to FIG. 5) extend. A direction Vsg orthogonal to the direction Vsl is parallel to the direction Vx. A direction Vss is a direction in which the scan lines GL (refer to FIG. 5) extend. The scan lines GL are inclined with respect to the direction Vx by an angle θg formed by the direction Vss and the direction Vsg. The directions Vsl and Vss are described in detail with reference to FIG. 9.

As illustrated in FIG. 9, the direction Vss is a direction in which an imaginary line connecting together first reference positions Pgl in the pixels PixR coupled to one of the scan lines GL extends. For example, each of the first reference positions Pgl is located on the scan line GL and is a midpoint between the signal lines SL that intersect the scan line GL in a plan view and are adjacent to each other. The first reference position Pgl is not limited to this position and may be the centroid of the area of the pixel PixR, for example. The first reference position Pgl is defined with reference to the pixel PixR but may be defined with reference to the pixel PixG or the pixel PixB instead of the pixel PixR.

As illustrated in FIG. 9, the direction Vsl is a direction in which an imaginary line connecting together second reference positions Psl in the pixels PixR coupled to one of the signal lines SL extends. For example, each of the second reference positions Psl is located on the signal line SL and is a midpoint between intersecting positions Pt at which the scan lines GL intersect the signal line SL in plan view. The second reference position Psl is not limited to this position and may be the centroid of the area of the pixel PixR, for example. The second reference position Psl is defined with reference to the pixel PixR but may be defined with reference to the pixel PixG or the pixel PixB instead of the pixel PixR.

As illustrated in FIG. 9, the pixel PixR and the pixel PixG adjacent to the pixel PixR are arranged so as to be offset from each other by a distance Δh1 in the direction Vsl. Two of the pixels PixR coupled to one of the scan lines GL are offset from each other by three times the distance Δh1. When half the distance Ph1 illustrated in FIG. 8 is equal to three times the distance Δh1 illustrated in FIG. 9, pixels of the same color, such as the pixels PixR, adjacent in the direction Vx are offset from each other by half in the direction Vsl. Therefore, the pixels of the same color are disposed at two types of positions in even-numbered columns and odd-numbered columns. As a result, horizontal black and white lines can be more finely displayed, and the substantial resolution of the display device 100 is improved. When the scan lines GL illustrated in FIG. 9 linearly extend along the direction Vss, each of the pixels PixR, PixG, and PixB has a parallelogram shape.

As illustrated in FIG. 10, the display panel 110 has sides 110e1, 110e2, 110e3, and 110e4 at substrate ends. A region of the display panel between the display region 111 and the sides 110e1, 110e2, 110e3, and 110e4 at the substrate ends is called the peripheral region GA.

A first scan line drive circuit 114A is disposed in the peripheral region GA between the side 110e1 at the substrate end of the display panel 110 and the display region 111. A second scan line drive circuit 114B is disposed in the peripheral region GA between the side 110e2 at the substrate end of the display panel 110 and the display region 111. The signal line coupling circuit 113 is disposed in the peripheral region GA between the side 110e4 at the substrate end of the display panel 110 and the display region 111. The driver IC 115 is disposed in the peripheral region GA between the side 110e4 at the substrate end of the display panel 110 and the display region 111.

The driver IC 115 is joined to terminals 115b with conductive members interposed therebetween in order to be electrically coupled to the array substrate SUB1 (refer to FIG. 6) of the display panel 110. The terminals 115b are generally arranged in one direction, and a direction Vp in which the terminals 115b are arranged is set to the direction Vx. The direction Vy is orthogonal to the direction Vx. In the first embodiment, the sides 110e3 and 110e4 at the substrate ends of the display panel 110 are parallel to the direction Vx. The sides 110e1 and 110e2 at the substrate ends of the display panel 110 are parallel to the direction Vy.

The scan line drive circuit 114 illustrated in FIG. 3 includes the first scan line drive circuit 114A, the second scan line drive circuit 114B, and a third scan line drive circuit 116 illustrated in FIG. 10. As illustrated in FIG. 10, the first scan line drive circuit 114A has a straight line portion 114C extending in the direction Vy, a straight line portion 114E extending in the direction Vx, and a straight line portion 114D connecting the straight line portion 114C to the straight line portion 114E. The straight line portion 114C is connected to the straight line portion 114D at a bent portion 114x1. The straight line portion 114D is connected to the straight line portion 114E at a bent portion 114x2. The display region 111 is octagon shaped. The straight line portion 114C, the straight line portion 114D, and the straight line portion 114E are thus along the display region 111. This configuration makes it possible to downsize the peripheral region GA of the display panel 110 in the first embodiment.

The second scan line drive circuit 114B has a straight line portion 114F extending in the direction Vy and a straight line portion 114G extending in a direction inclined with respect to the direction Vy. The straight line portion 114F is connected to the straight line portion 114G at a bent portion 114x3. The display region 111 is octagon shaped. The straight line portion 114F, and the straight line portion 114G are thus along the display region 111. This configuration makes it possible to downsize the peripheral region GA of the display panel 110 in the first embodiment.

The third scan line drive circuit 116 is disposed adjacent to the straight line portion 114F of the second scan line drive circuit 114B. The third scan line drive circuit 116 extends in the direction Vy and is parallel to the straight line portion 114F of the second scan line drive circuit 114B. This configuration shortens the straight line portion 114F of the second scan line drive circuit 114B, making it possible to downsize the peripheral region GA.

The signal line coupling circuit 113 has a bent portion, which is non-parallel to the direction Vx.

The display region 111 is octagon shaped. Octagon is one of the polygons. This shape makes it possible to downsize a non-display region between the display region 111 and the straight line portions 114C, 114D, 114E, 114F, and 114G. As a result, the display panel 110 of the first embodiment allows a sufficient area of the display region 111 to be kept although the peripheral region GA is downsized. The display region 111 is not limited to be shaped in octagon, but can be shaped in pentagon, hexagon, heptagon, nonagon, or decagon, for example. The outer shape of the display region only needs to be a polygon having five or more sides.

As illustrated in FIG. 10, the display device 100 has the display region 111 viewed through the lens 410. The display region 111 is provided to the array substrate SUB1. As illustrated in FIGS. 8 and 9, the display region 111 includes the pixels PixR, PixG, and PixB, the scan lines GL extending in the first direction Vss, and the signal lines SL extending in the second direction Vsl. The first direction Vss is non-parallel and non-orthogonal to the direction orthogonal to the second direction Vsl. The first pixels PixR for displaying the first color (red) are continuously arranged in the second direction Vsl. The second pixels PixG for displaying the second color (green) are continuously arranged in the second direction Vsl. The third pixels PixB for displaying the third color (blue) are continuously arranged in the second direction Vsl. One of the first pixels PixR and another of the first pixels PixR arranged next thereto in the first direction Vss are arranged so as to be offset from each other by half the distance Ph1 of the first pixel PixR in the second direction Vsl. This configuration improves the substantial resolution of the display device 100.

As illustrated in FIG. 10, the scan lines GGL, which are the scan lines outside the display region 111, are electrically coupled to the scan lines GL in the display region 111, respectively. The signal lines SSL, which are the signal lines outside the display region 111, are electrically coupled to the signal lines SL in the display region 111, respectively.

Figure 11:
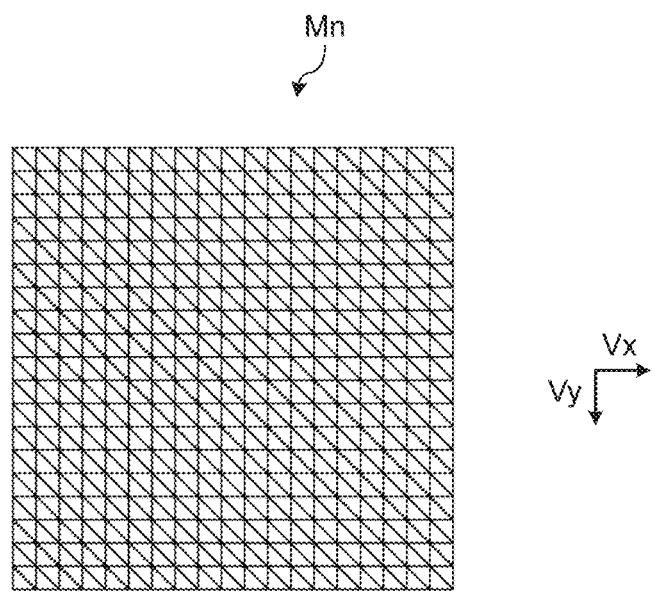
FIG. 11 is a diagram illustrating exemplary images received by the display system according to the first embodiment.
Figure 12:
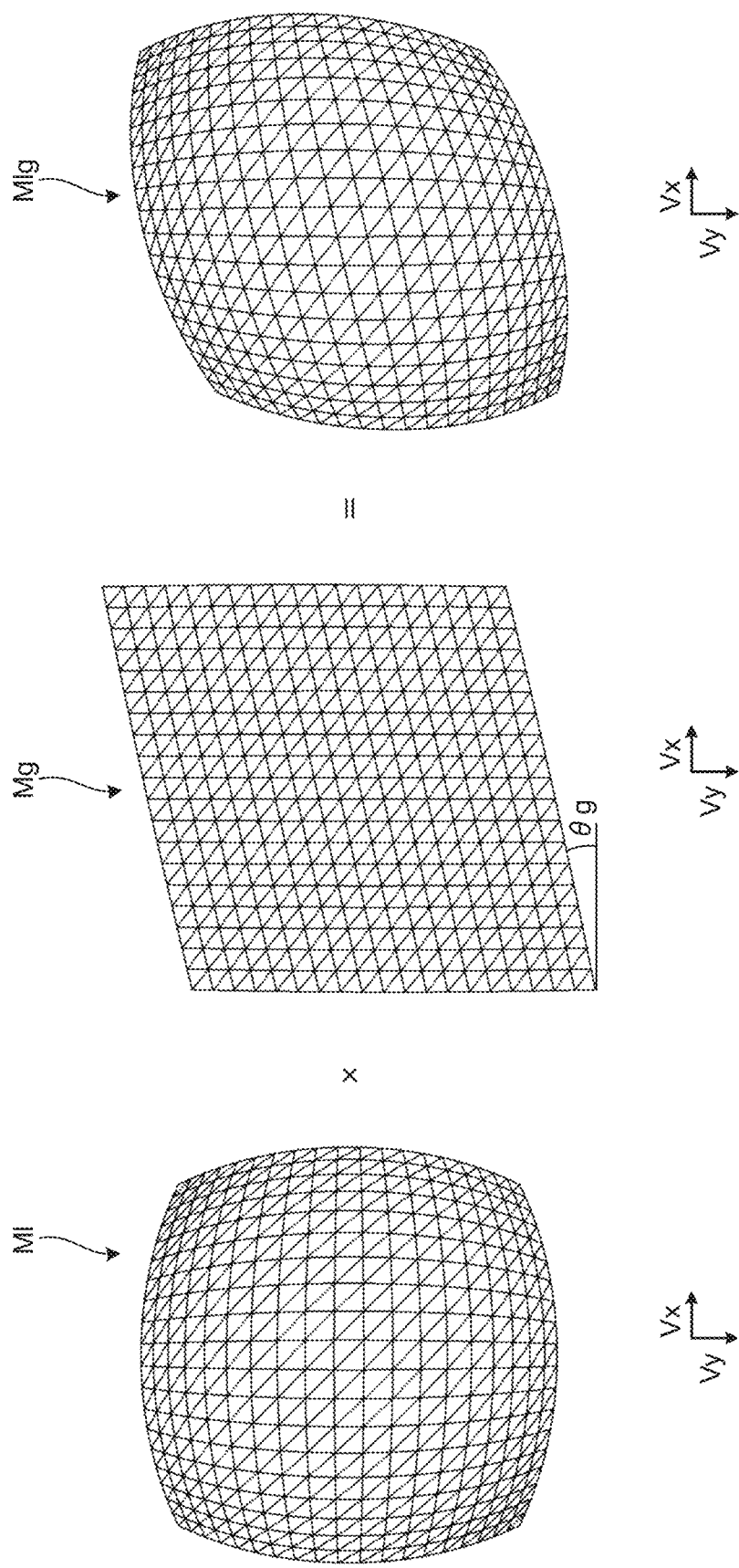
FIG. 12 is a diagram illustrating an example of compensation processing to compensate for a distortion of the images displayed by the display system according to the first embodiment.

The direction Vss in which the scan lines GL extend is non-orthogonal to the direction Vsl in which the signal lines SL extend. The display system 1 thus performs compensation processing on the image such that the image recognized by the user is not distorted. FIG. 11 is a diagram illustrating exemplary images received by the display system according to the first embodiment. FIG. 12 is a diagram illustrating an example of the compensation processing to compensate for the distortion of the images displayed by the display system according to the first embodiment.

In the example illustrated in FIG. 11, images Mn to be displayed for the user are arranged in a matrix having a row-column configuration in the direction Vx and the direction Vy. The GPU of the controller 230 illustrated in FIG. 3 calculates first compensated images MI by performing an image deformation process for eliminating (reducing) lens distortion of the lens 410 (refer to FIG. 2) on the images Mn illustrated in FIG. 11. The GPU of the controller 230 illustrated in FIG. 3 calculates second compensated images Mg by performing an image deformation process of compensating for distortion that deforms the images Mn illustrated in FIG. 11 due to the influence of the angle θg. The GPU of the controller 230 illustrated in FIG. 3 transmits, to the display device 100, third compensated images MIg obtained by combining the first compensated images MI and the second compensated images Mg for the images Mn illustrated in FIG. 11.

In FIG. 12, the two image deformation processes to obtain the first compensated images MI and the second compensated images Mg for finally obtaining the third compensated images MIg are performed at once using a texture mapping method generally used in image processing with the GPU. Specifically, an image of a texture mapped to a polygon mesh (image) reflecting target distortion of the third compensated images MIg in FIG. 12 is a distorted image element of the third compensated images MIg to be obtained. Therefore, by keeping the polygon mesh (image) corresponding to the third compensated images MIg in the storage 220, or by generating the polygon mesh (image) of the third compensated images MIg by calculation by the controller 230 at the start of the display system 1, the polygon mesh (image) can be applied when display processing for each frame is performed. As a result, the third compensated images MIg as the final target can be obtained by performing the texture mapping processing only once.

This method does not increase the number of image processing steps as compared with the general VR image distortion compensation processing in which only the first compensated images MI is obtained without obtaining the second compensated images Mg by performing the processing of the second compensated images Mg. Consequently, it is possible to prevent an increase in cost due to the execution of the processing of the second compensated images Mg in the first embodiment.

As described above, the control device 200 performs the second compensation processing to compensate for the distortion that deforms the image due to the influence of the angle θg formed by the first direction Vss in which the scan lines GL extend with respect to the direction Vsg orthogonal to the second direction Vsl. As a result, the display device 100 can cause the user to recognize the images Mn illustrated in FIG. 11 by displaying the third compensated images MIg.

Figure 13:
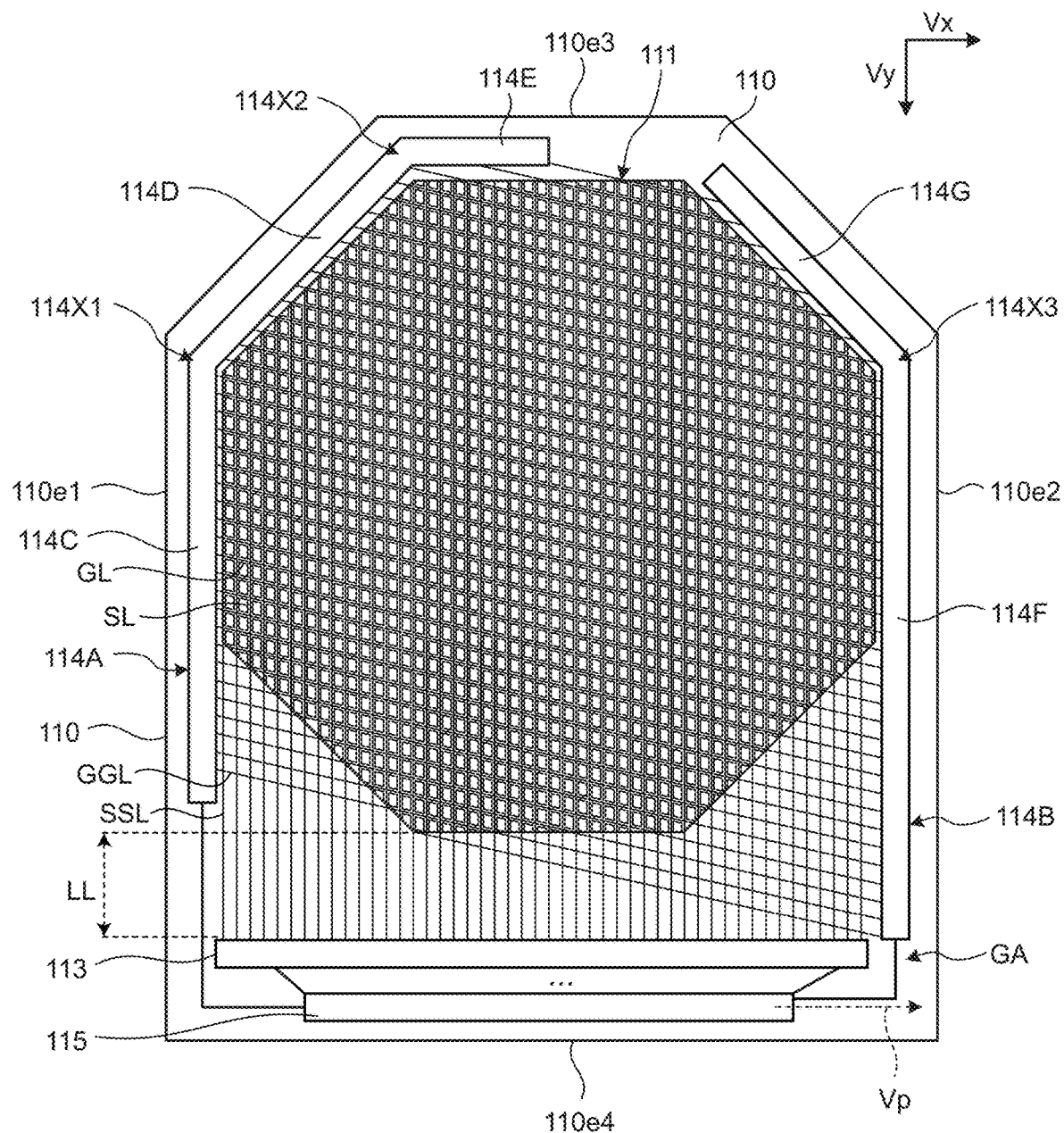
FIG. 13 is a schematic diagram illustrating the display region according to a comparative example.

The driver IC 115 of the display control circuit 112 may perform the second compensation processing. The driver IC 115 performs the second compensation processing to compensate for the distortion that deforms the image due to the influence of the angle θg. As a result, the control device 200 can reduce the computational load on the GPU. FIG. 13 is a schematic diagram illustrating the display region according to a comparative example. As illustrated in FIG. 13, the comparative example does not have the third scan line drive circuit 116. The second scan line drive circuit 114B extends further in the direction Vy than the first scan line drive circuit 114A because the scan lines GL are inclined with respect to the direction Vx. Therefore, as illustrated in FIG. 13, the length of the straight line portion 114C of the first scan line drive circuit 114A and that of the straight line portion 114F of the second scan line drive circuit 114B are different. This causes a length LL of the peripheral region GA to increase, resulting in an increase in area of the peripheral region GA in the display device in the comparative example.

In contrast, in the first embodiment, as illustrated in FIG. 10, the second scan line drive circuit 114B and the third scan line drive circuit 116 are adjacent, and some (one or more) scan lines coupling to the second scan line drive circuit 114B pass through the third scan line drive circuit 116 and extend to the display region 111. As illustrated in FIG. 10, the length corresponding to the length LL of the peripheral region GA illustrated in FIG. 13 is smaller.

Figure 14:
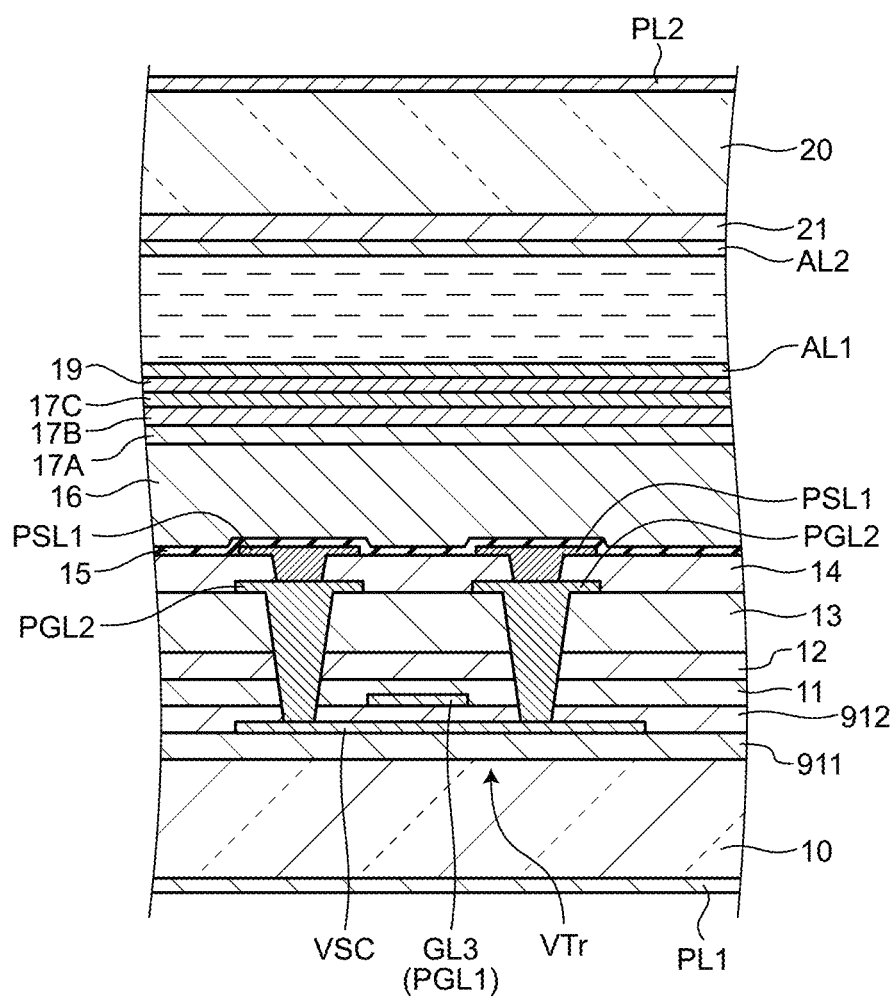
FIG. 14 is a sectional view schematically illustrating a part of a scan line drive circuit according to the first embodiment.

FIG. 14 is a sectional view schematically illustrating a part of the scan line drive circuit according to the first embodiment. As illustrated in FIG. 14, the second scan line drive circuit 114B and the third scan line drive circuit 116 each include a transistor VTr.

A semiconductor layer VSC of the transistor VTr is located on the first base insulating film 911. The first base insulating film 911 is located on the first insulating substrate 10. A gate electrode GL3 of a third wiring layer PGL1 is located on the second base insulating film 912. The third wiring layer PGL1 in FIG. 14 functions as the scan line GGL.

The second base insulating film 912 is located on the semiconductor layer VSC and the first base insulating film 911. The gate electrode GL3 of the third wiring layer PGL1 is located on the second base insulating film 912. Contact holes are formed by making holes in the second base insulating film 912, the first insulating film 11, the second insulating film 12, the third insulating film 13, and the fourth insulating film 14 at positions overlapping the semiconductor layer VSC. A second wiring layer PGL2 formed on the third insulating film 13 and the first wiring layer PSL1 formed on the fourth insulating film 14 are electrically coupled to the semiconductor layer VSC through the contact holes. The first wiring layer PSL1 is formed in the same layer as the signal lines SL. The second wiring layer PGL2 is formed in the same layer as the gate electrode GL2 illustrated in FIG. 6. The third wiring layer PGL1 is formed in the same layer as the gate electrode GL1 illustrated in FIG. 6.

Figure 15:
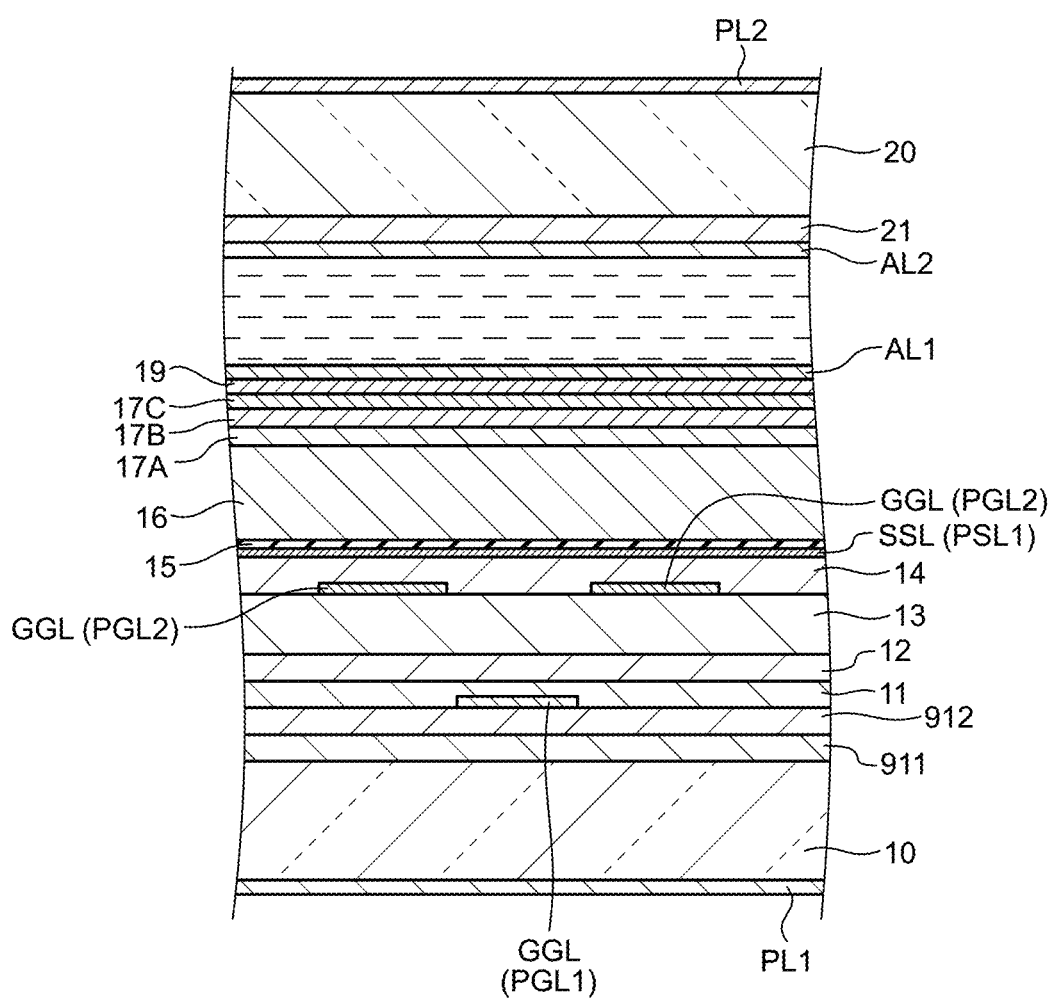
FIG. 15 is a sectional view schematically illustrating an example of the scan lines extended from a second scan line drive circuit and a third scan line drive circuit according to the first embodiment.

FIG. 15 is a sectional view schematically illustrating an example of the scan lines extended from the second and the third scan line drive circuits according to the first embodiment. The third wiring layer PGL1 extended from the second scan line drive circuit 114B is formed in the same layer as the first gate electrode GL1 (refer to FIG. 6). The multiple scan lines GGL extended from the third scan line drive circuit 116 are formed by the second wiring layer PGL2 formed in the same layer as the second gate electrode GL2 (refer to FIG. 6) and the third wiring layer PGL1 formed in the same layer as the first gate electrode GL1 (refer to FIG. 6), which are separately formed. The signal line SSL extended from the signal line coupling circuit 113 is formed by the first wiring layer PSL1 formed in the same layer as the signal lines SL (refer to FIG. 6). The signal line SSL intersects the scan lines GGL three-dimensionally.

As illustrated in FIG. 10, some (one or more) scan lines GGL coupled to the second scan line drive circuit 114B pass through the third scan line drive circuit 116. For example, when the scan lines GGL coupled to and extended from the third scan line drive circuit 116 are formed by the second wiring layers PGL2, some scan lines GGL that are formed by the third wiring layers PGL1 and coupled to the second scan line drive circuit 114B can pass through the third scan line drive circuit 116. The scan lines GGL formed by the second wiring layers PGL2 are in a layer different from that in which the scan lines GGL formed by the third wiring layers PGL1. This configuration makes it possible to reduce the wiring line interval in plan view. The scan line GGL that passes through the third scan line drive circuit 116 and the scan line GGL that is coupled to the third scan line drive circuit 116 are alternately arranged and alternately driven.

Figure 16A:
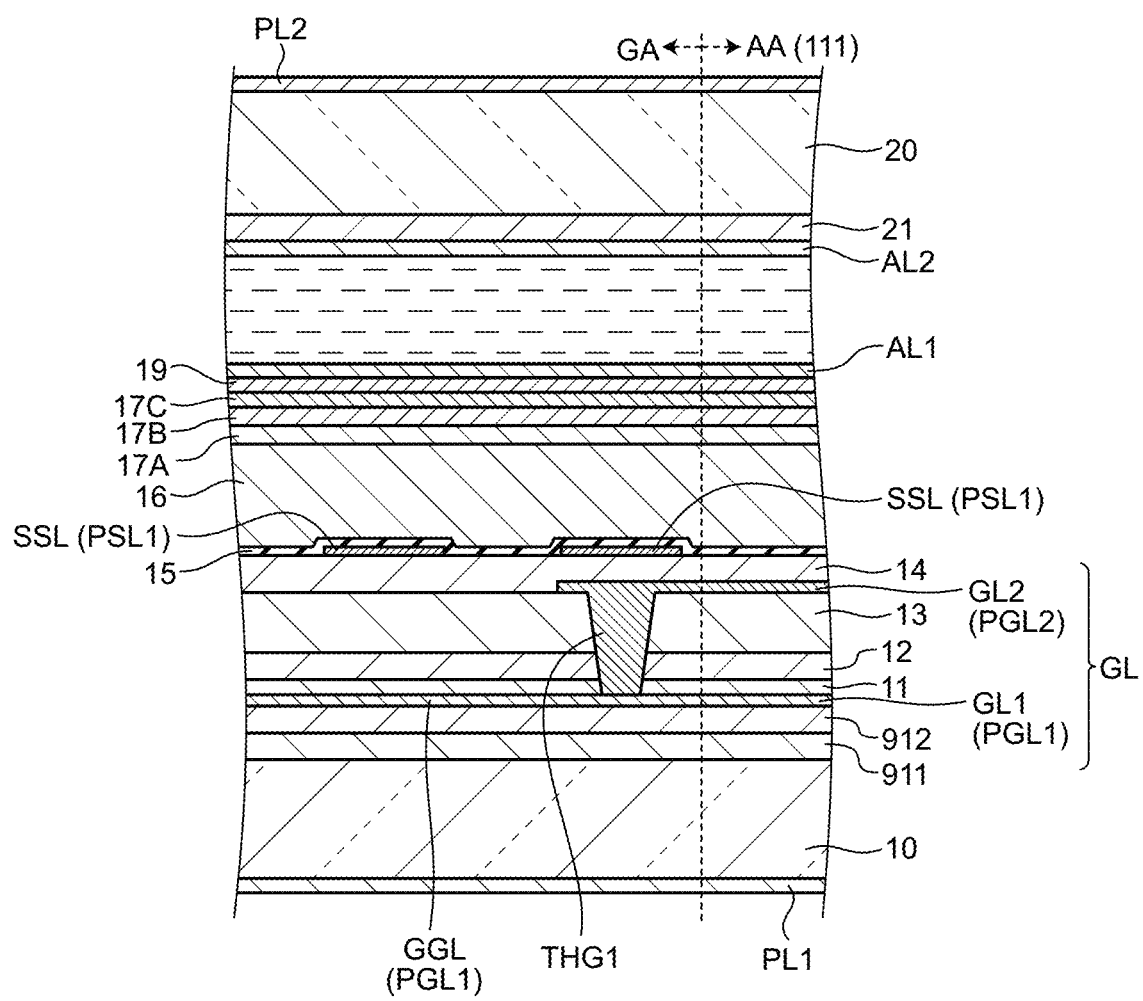
FIG. 16A is a sectional view schematically illustrating an example of the scan line extended from the second scan line drive circuit according to the first embodiment.

FIG. 16A is a sectional view schematically illustrating an example of the scan line extended from the second scan line drive circuit according to the first embodiment. In FIG. 16A, the display region AA is a part of the display region 111, and the peripheral region GA is an outside of the display region AA. In the peripheral region GA, the scan line GGL extended from the second scan line drive circuit 114B is formed by the third wiring layer PGL1. A contact hole THG1, which is formed by making a hole in the first insulating film 11, the second insulating film 12, and the third insulating film 13, is provided in the peripheral region GA outside the edge of the display region AA. The scan line GGL formed by the third wiring layer PGL1 becomes two-layer scan lines GL one of which is coupled to the gate electrode GL1 and the other of which is coupled to the gate electrode GL2 through the contact hole THG1.

Figure 16B:
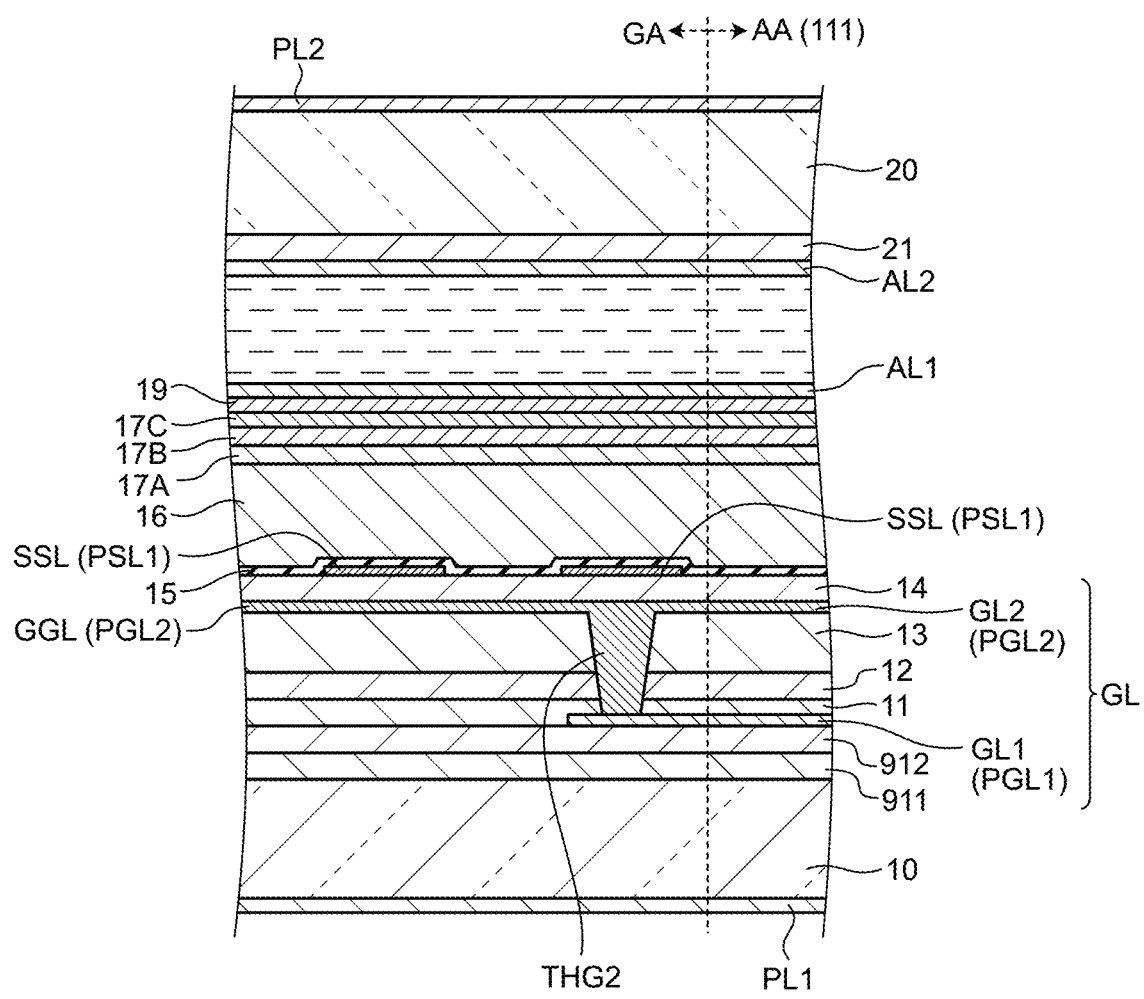
FIG. 16B is a sectional view schematically illustrating an example of the scan line extended from the third scan line drive circuit according to the first embodiment.

FIG. 16B is a sectional view schematically illustrating an example of the scan line extended from the third scan line drive circuit according to the first embodiment. In FIG. 16B, the display region AA is a part of the display region 111, and the peripheral region GA is the outside of the display region AA is. In the peripheral region GA, the scan line GGL extended from the third scan line drive circuit 116 is formed by the second wiring layer PGL2. A contact hole THG2, which is formed by making a hole in the first insulating film 11, the second insulating film 12, and the third insulating film 13, is provided in the peripheral region GA outside the edge of the display region AA. The scan line GGL formed by the second wiring layer PGL2 becomes two-layer scan lines GL one of which is coupled to the gate electrode GL1 and the other of which is coupled to the gate electrode GL2 through the contact hole THG2.

Figure 17:
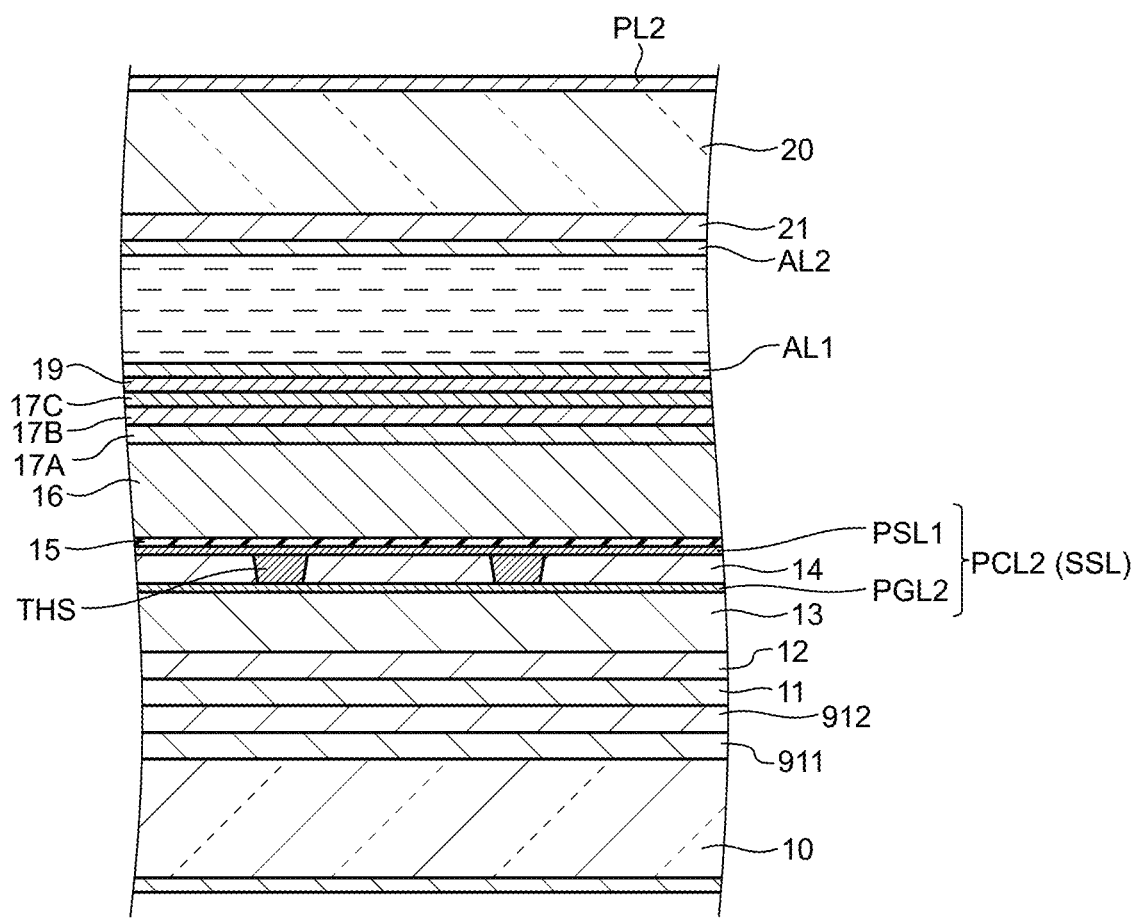
FIG. 17 is a sectional view schematically illustrating an example of signal wiring in the peripheral region according to the first embodiment.

FIG. 17 is a sectional view schematically illustrating an example of the signal wiring line in the peripheral region according to the first embodiment. The second wiring layer PGL2 of the signal line SSL extended from the signal line coupling circuit 113 can be used as a part of the signal line wiring, in a region not interfering with the second wiring layer PGL2 used for the scan line GGL. For example, as illustrated in FIG. 17, the first wiring layer PSL1 is coupled to the second wiring layer PGL2 through a contact hole THS produced in the fourth insulating film 14. The signal line SSL consists of the first wiring layer PSL1, the second wiring layer PGL2, and the contact hole THS, and serves as a second coupling wiring line PCL2 of the two-layer structure.

In the first embodiment, the signal lines SSL may be extended from the driver IC and coupled to the signal lines SL in the display region 111, without the signal line coupling circuit 113. Even in this case, the second coupling wiring line PCL2 illustrated in FIG. 17 in a region not interfering with the second wiring layer PGL2 used for the scan line GGL can be used.

Furthermore, the second coupling wiring line PCL2 illustrated in FIG. 17 may also be used as the signal line SSL coupling between the driver IC 115 and the signal line coupling circuit 113.

The signal line SSL at the location passing the second wiring layer PGL2 of the scan line GGL is formed by only the first wiring layer PSL1.

Figure 18:
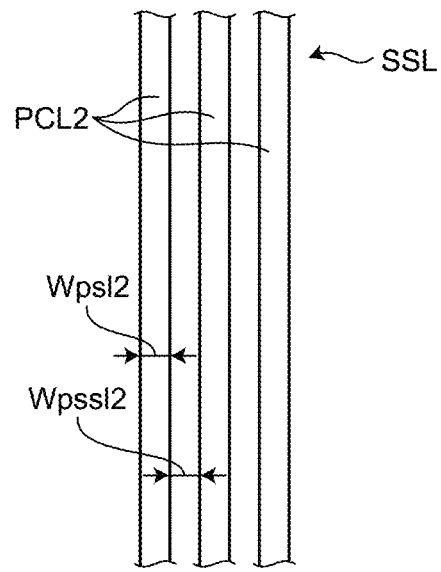
FIG. 18 is a plan view schematically illustrating an example of the signal wiring illustrated in FIG. 17.
Figure 19:
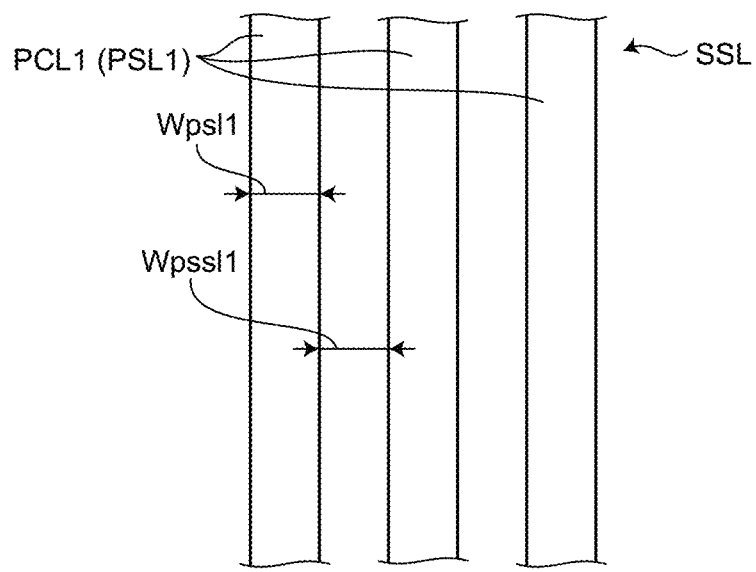
FIG. 19 is a plan view schematically illustrating an example of the signal wiring in the peripheral region according to the first embodiment.

FIG. 18 is a plan view schematically illustrating an example of the signal wiring illustrated in FIG. 17. FIG. 19 is a plan view schematically illustrating a part of the signal wiring in the peripheral region according to the first embodiment. The second coupling wiring lines PCL2 illustrated in FIGS. 17 and 18 have a wiring line width Wps12 and are arranged with a wiring line interval Wpss12. In contrast, first coupling wiring lines PCL1, each of which consists of only the first wiring layer PSL1, have a wiring line width Wps11 and are arranged with a wiring line interval Wpss11, as illustrated in FIG. 19. The second coupling wiring line PCL2 has a lower length resistance per unit for the volume of the second wiring layer PGL2, than that of the first coupling wiring line PCL1. As a result, the wiring line width Wps12 can be made smaller than the wiring line width Wps11, and the wiring line interval Wpss12 can be made smaller than the wiring line interval Wpss11. The second coupling wiring line PCL2 has a lower length resistance per unit than that of the first coupling wiring line PCL1, making it possible for the width to be made smaller than that of the first coupling wiring line PCL1. As a result, the density of the second coupling wiring lines PCL2 per unit area is higher than that of the first coupling wiring lines PCL1. The width is the length in the direction perpendicular to the direction in which the first coupling wiring line PCL1 or the second coupling wiring line PCL2 extends.

As described above, the first coupling wiring lines PCL1, each of which consists of only the first wiring layer PSL1 as a single layer, and the second coupling wiring lines PCL2 are coupled to the signal line coupling circuit 113, as the signal lines SSL. The first coupling wiring line PCL1 consists of only the first wiring layer PSL1 formed in the same layer as the signal line SL. The second coupling wiring line PCL2 consists of two layers: the first wiring layer PSL1 and the second wiring layer PGL2. The second coupling wiring line PCL2 has a smaller width than that of the first coupling wiring line PCL1, which consists of only the first wiring layer PSL1, thus making it possible to downsize the peripheral region GA.

As described above, the display device 100 includes the array substrate SUB1, the display region 111 and the peripheral region GA that are provided to the array substrate SUB1. The display region 111 has a shape of a polygon with five or more sides. The display region 111 has the pixels Pix, the scan lines GL extending in the direction Vss, and the signal lines SL extending in the direction Vsl. The peripheral region GA is located between the end of the array substrate SUB1 and the display region 111. The first scan line drive circuit 114A, the second scan line drive circuit 114B, the third scan line drive circuit 116, the signal line coupling circuit 113, and the driver IC 115 are arranged in the peripheral region GA. The first scan line drive circuit 114A, the second scan line drive circuit 114B, and the third scan line drive circuit 116 are coupled to the scan lines GL through the scan lines GGL. The second scan line drive circuit 114B is disposed in the peripheral region GA opposite the first scan line drive circuit 114A with the display region 111 interposed therebetween. The third scan line drive circuit 116 is disposed in the peripheral region GA opposite the first scan line drive circuit 114A with the display region 111 interposed therebetween. The signal line coupling circuit 113 is coupled to the signal lines SL through the signal lines SSL. The driver IC 115 controls the first scan line drive circuit 114A, the second scan line drive circuit 114B, the third scan line drive circuit 116, and the signal line coupling circuit 113. The second scan line drive circuit 114B and the third scan line drive circuit 116 are adjacent to each other. Some scan lines GL coupled to the second scan line drive circuit 114B pass through the third scan line drive circuit 116 and extend to the display region 111. This configuration shortens the straight line portion of the second scan line drive circuit 114B, resulting in downsizing the peripheral region GA.

The direction Vss is non-parallel and non-orthogonal to the direction orthogonal to the direction Vsl. This configuration improves the substantial resolution of the display device 100. This configuration, however, may cause a difference between the length of the straight line portion 114C of the first scan line drive circuit 114A and the straight line portion 114F of the second scan line drive circuit 114B, as in the comparative example. In the first embodiment, the second scan line drive circuit 114B and the third scan line drive circuit 116 are adjacent to each other, resulting in downsizing the peripheral region GA. This prevents an increase in size of the display panel 110 due to the effect of the direction Vss being non-parallel and non-orthogonal to the direction orthogonal to the direction Vsl.

Second Embodiment

Figure 20:
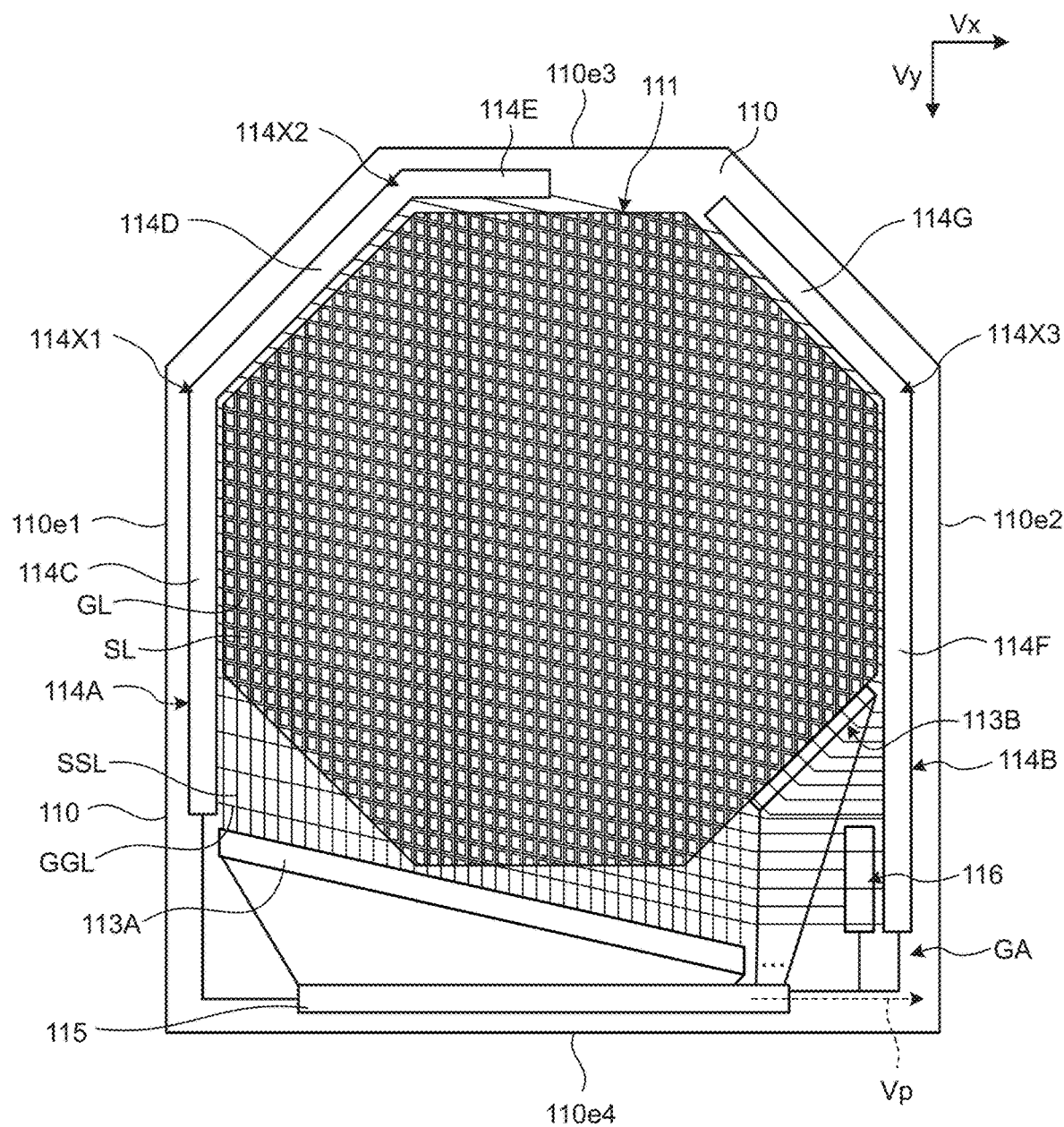
FIG. 20 is a schematic diagram illustrating an example of the display region according to a second embodiment.

FIG. 20 is a schematic diagram illustrating an example of the display region according to a second embodiment. In the following description, the same components are denoted with the same reference numerals as the first embodiment, and descriptions thereof are omitted.

As illustrated in FIG. 20, the display device in the second embodiment has a first signal line coupling circuit 113A and a second signal line coupling circuit 113B. The second signal line coupling circuit 113B is disposed in the peripheral region GA in which the third scan line drive circuit 116 is disposed. The second signal line coupling circuit 113B is disposed at a location which is a part of the peripheral region GA and different from that of the first signal line coupling circuit 113A.

The second signal line coupling circuit 113B is along one side of the polygonal display region 111, the one side being different from the side that the first signal line coupling circuit 113A faces. Some scan lines GL coupled to the second scan line drive circuit 114B pass through the second signal line coupling circuit 113B and extend to the display region 111. The longitudinal direction of the second signal line coupling circuit 113B intersects the direction Vx and also the direction Vy. The longitudinal direction of the second signal line coupling circuit 113B is along one side of the display region 111, making it possible to increase the space between the transistors VTr. As a result, the number of scan lines GL that pass through the second signal line coupling circuit 113B can be increased.

As described above, the display device in the second embodiment includes the first signal line coupling circuit 113A and the second signal line coupling circuit 113B disposed at a location different from that of the first signal line coupling circuit 113A. The longitudinal direction of the first signal line coupling circuit 113A is different from that of the second signal line coupling circuit 113B. The longitudinal direction of the second signal line coupling circuit 113B is along one side of the display region 111. Some scan lines GL coupled to the second scan line drive circuit 114B pass through the second signal line coupling circuit 113B and extend to the display region 111. The space between the second scan line drive circuit 114B and the second signal line coupling circuit 113B can also be used to route the scan lines GL, making it possible to further downsize the peripheral region GA.

Third Embodiment

In the first embodiment, the pixels Pix of the same color are continuously arranged in the direction Vsl. In a third embodiment, however, the pixels Pix of the same color are not continuously arranged in the direction Vsl. In the following description, the same components as those in any of the first and the second embodiments are denoted by the same reference numerals, and the descriptions thereof are omitted.

Figure 21:
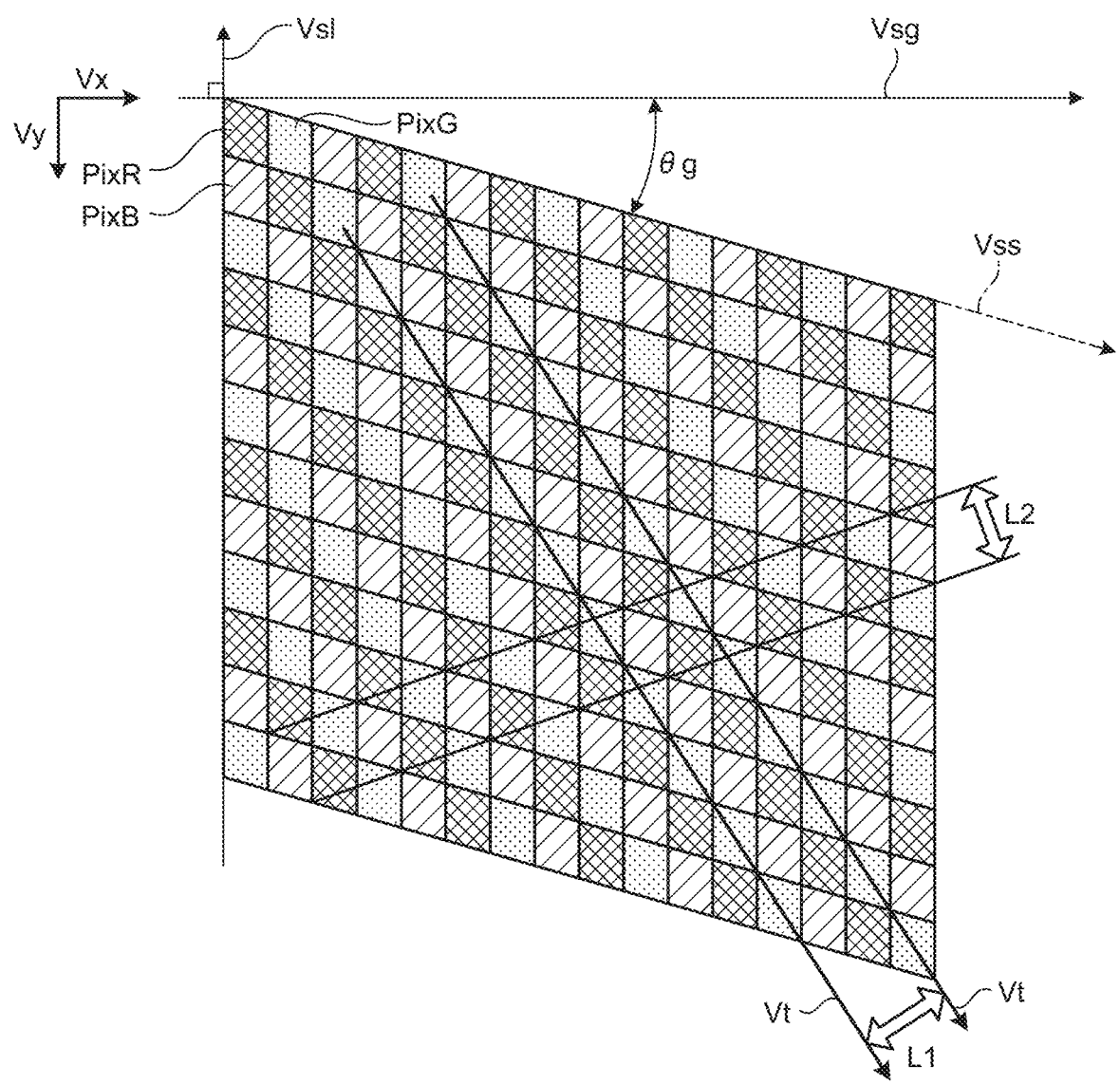
FIG. 21 is a schematic diagram schematically illustrating an enlarged view of a part of the display region in a third embodiment.
Figure 22:
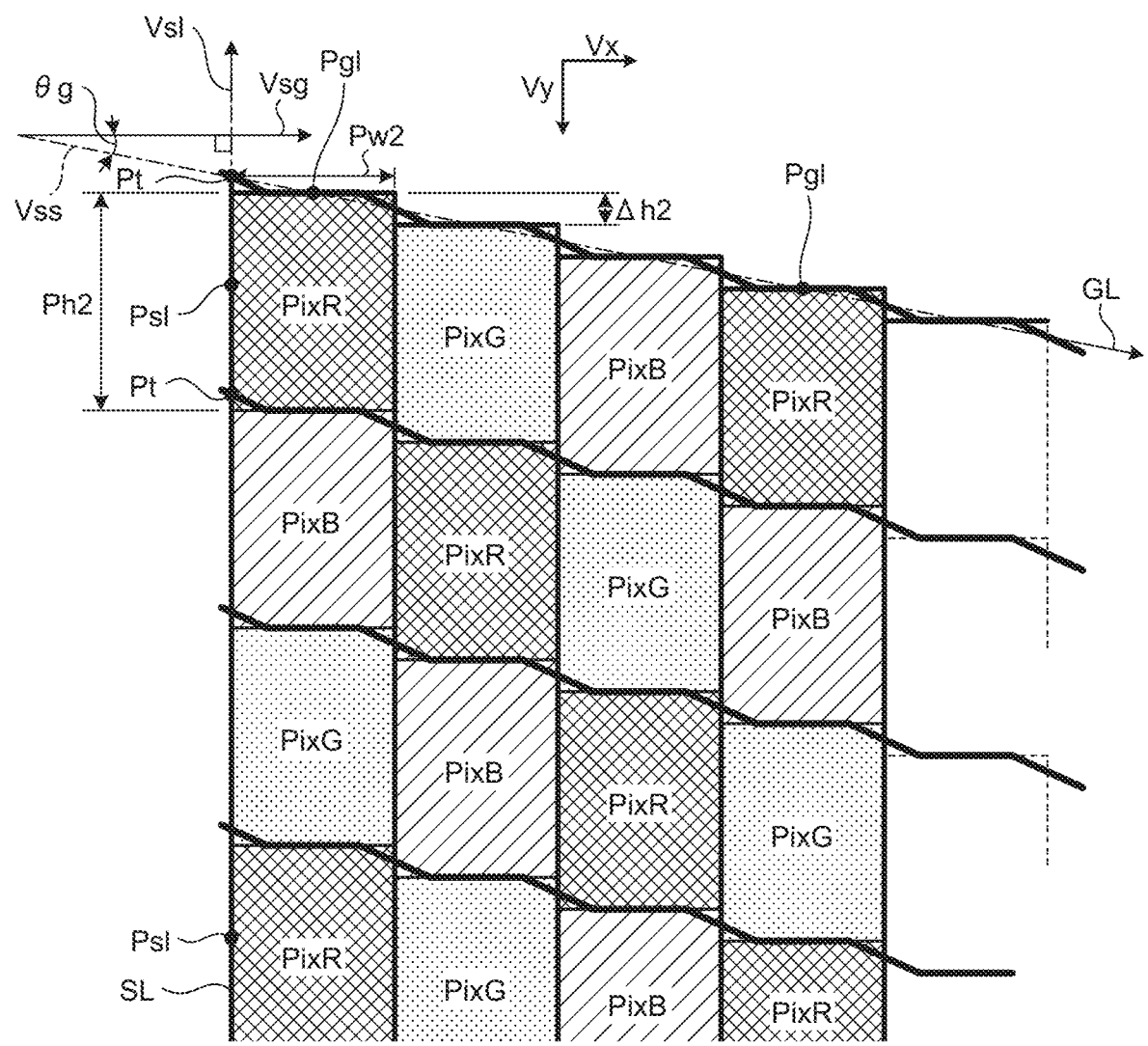
FIG. 22 is a schematic diagram illustrating a relation between the signal lines and the scan lines in FIG. 21.
Figure 23:
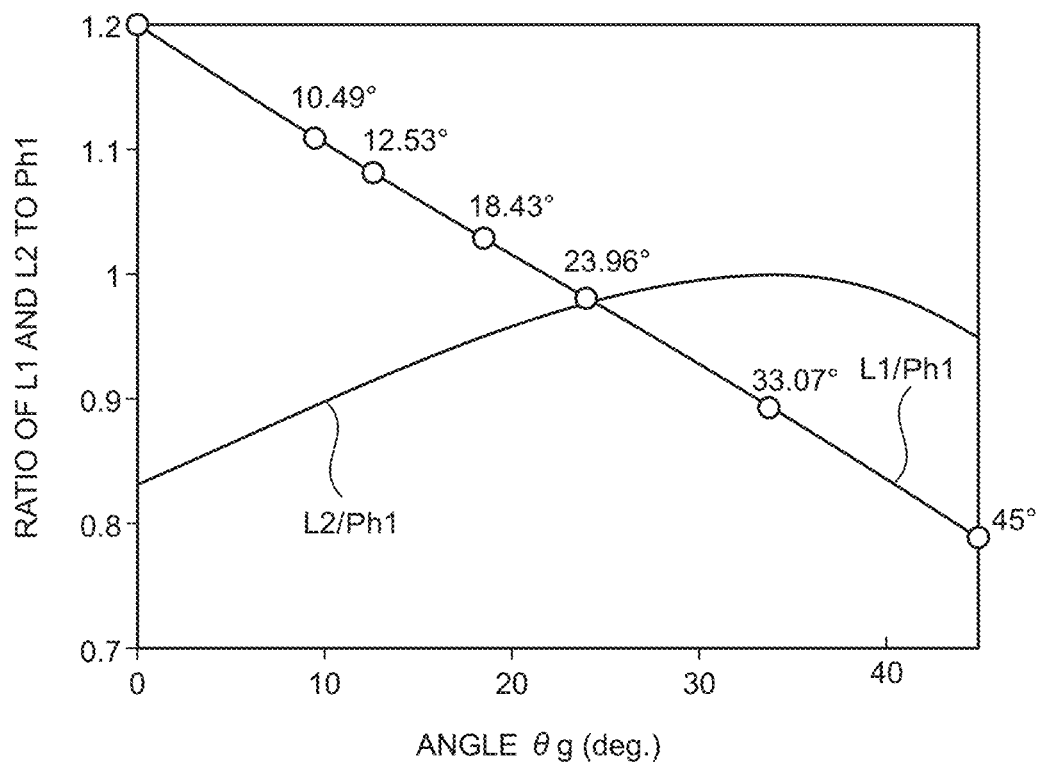
FIG. 23 is an explanatory diagram illustrating relations of ratios of same color pixel intervals to a reference distance in a second direction between the pixels with the inclination of the scan lines in the third embodiment.

FIG. 21 is a schematic diagram schematically illustrating an enlarged view of a part of the display region in the third embodiment. FIG. 22 is a schematic diagram illustrating a relation between the signal lines and the scan lines in FIG. 21. FIG. 23 is an explanatory diagram illustrating relations of ratios of same color pixel intervals to a reference distance in the second direction between the pixels with the inclination of the scan lines in the third embodiment. Also, in the third embodiment, the direction in which the signal lines SL extend is parallel to the direction Vy as illustrated in FIG. 5. The direction in which the scan lines GL extend is parallel to neither the direction Vx nor the direction Vy. The direction in which the scan lines GL extend is non-orthogonal to the direction in which the signal lines SL extend. Each of the pixels PixR, PixG, and PixB thus has a parallelogram shape, for example.

In FIG. 21, the direction Vsl is a direction in which the signal lines SL (refer to FIG. 5) extend. The direction Vsg orthogonal to the direction Vsl is parallel to the direction Vx. The direction Vss is a direction in which the scan lines GL (refer to FIG. 5) extend. The scan lines GL are inclined with respect to the direction Vx by the angle θg formed by the direction Vss and the direction Vsg. The directions Vsl and Vss are explained in detail with reference to FIG. 22.

The shape of each of the pixels PixR, PixG, and PixB is exemplified as a parallelogram shape, but is not limited to a parallelogram shape. As illustrated in FIG. 22, the direction Vss is a direction in which an imaginary line connecting together the first reference positions Pgl in the pixels PixR coupled to one of the scan lines GL extends. For example, each of the first reference positions Pgl is located on the scan line GL and is a midpoint between the signal lines SL that intersect the scan line GL in plan view and are adjacent to each other.

The direction Vsl is a direction in which an imaginary line connecting together the second reference positions Psl in the pixels PixR coupled to one of the signal lines SL extends. For example, each of the second reference positions Psl is located on the signal line SL and is a midpoint between the intersecting positions Pt at which the scan lines GL intersect the signal line SL in plan view.

As illustrated in FIG. 22, the pixel PixR and the pixel PixG adjacent to the pixel PixR are arranged so as to be offset from each other by a distance Δh2 in the direction Vsl. Δh2 is approximately equal to Pw2×tan(θg).

The display system 1 illustrated in FIG. 1 is worn on the head of the user. Thus, the display device 100 is required to be small. In order to increase the resolution in the situation where the size of the display panel 110 is limited as described above, the pixels Pix in the display region 111 that is viewed through the lens 410 need to be smaller For example, in the pixel arrangement illustrated in FIG. 9, the length in the direction Vx of each of the pixels PixR, PixG, and PixB is the distance Pw1. For example, if the distance Pw1 is reduced to 12 μm, the area ratio of the light-blocking layer BM described above increases and the aperture ratio decreases, which may increase the power consumption in order to ensure constant luminance.

Therefore, in the third embodiment, the pixels PixR, PixG, and PixB are arranged as illustrated in FIG. 21.

As illustrated in FIG. 21, the pixel PixR is disposed between the pixel PixB and the pixel PixG in the direction Vss and is disposed between the pixel PixB and the pixel PixG in the direction Vsl.

In addition, the pixel PixG is disposed between the pixel PixR and the pixel PixB in the direction Vss and is disposed between the pixel PixR and the pixel PixB in the direction Vsl.

Furthermore, the pixel PixB is disposed between the pixel PixG and the pixel PixR in the direction Vss and is disposed between the pixel PixG and the pixel PixR in the direction Vsl.

The pixel PixR, the pixel PixG, and the pixel PixB are repeatedly arranged in this order in the direction Vss. The pixel PixR, the pixel PixG, and the pixel PixB are repeatedly arranged in this order in the direction Vsl.

In the pixel arrangement illustrated in FIG. 22, the length in the direction Vx of each of the pixels PixR, PixG, and PixB is a distance Pw2; and the length in the direction Vy of each of the pixels PixR, PixG, and PixB is a distance Ph2. The distance Pw2 is 3/2 times the distance Pw1 illustrated in FIG. 9, and the distance Ph2 is ⅔ times the distance Ph1 illustrated in FIG. 9. The arrangement of the pixels PixR, PixG, and PixB as illustrated in FIG. 21 allows sufficient distance Pw2, thereby improving the aperture ratio of each of the pixels PixR, PixG, and PixB. When the scan lines GL illustrated in FIG. 22 linearly extend along the direction Vss, each of the pixels PixR, PixG, and PixB has a parallelogram shape as illustrated in FIG. 5.

However, in the arrangement of the pixels PixR, PixG, and PixB as illustrated in FIG. 21, for example, the green pixels PixG highly visible to the user are continuously arranged obliquely (in a third direction Vt) with respect to the direction Vx. When the angle θg is 0 degrees, the pixels PixG are easily visually recognized as an oblique line by the user. The phenomenon in which a pixel structure is visually recognized by the user is called a screen-door effect.

As described above, the display device 100 has the display region 111 viewed through the lens 410. The display region 111 is provided to the array substrate SUB1. The display region 111 includes the pixels PixR, PixG, and PixB, the scan lines GL extending in the first direction Vss, and the signal lines SL extending in the second direction Vsl. In the display device 100 of the third embodiment, the screen-door effect is unlikely to occur when the direction Vss is non-parallel and non-orthogonal to the direction Vx.

As described above, the direction Vss and the direction Vsg form the angle θg. In FIG. 21, the pixel intervals of the green pixels PixG highly visible to the user are L1 and L2. The distance Ph1 illustrated in FIG. 9 is used herein as a reference distance for comparison. FIG. 23 illustrates the relations of the angle θg with the ratios of the same color pixel intervals L1 and L2 to the distance Ph1 illustrated in FIG. 9.

As illustrated in FIG. 23, the intervals L1 and L2 between pixels of the same color change with the angle θg. Of the intervals L1 and L2, the interval L1 between pixels of the same color with pixels of different colors interposed therebetween needs to be reduced in order to reduce (eliminate) the screen-door effect. When L1/Ph1 is from 0.9 to 1.1, the screen-door effect is smaller than when L1/Ph1 is 1.2, and the user is less likely to visually recognize an oblique line pattern. When L1/Ph1 is 0.8, the user may visually recognize the oblique line pattern.

Therefore, in the display device of the third embodiment, when the angle θg is from 10.49 to 33.07 degrees, L1/Ph1 is from 0.9 to 1.1, and the screen-door effect is reduced. The screen-door effect decreases as the ratio between the interval L1 and the interval L2 is closer to 1.0. Therefore, the screen-door effect is smaller when the angle θg is from 12.53 to 23.96 degrees.

Fourth Embodiment

Figure 24:
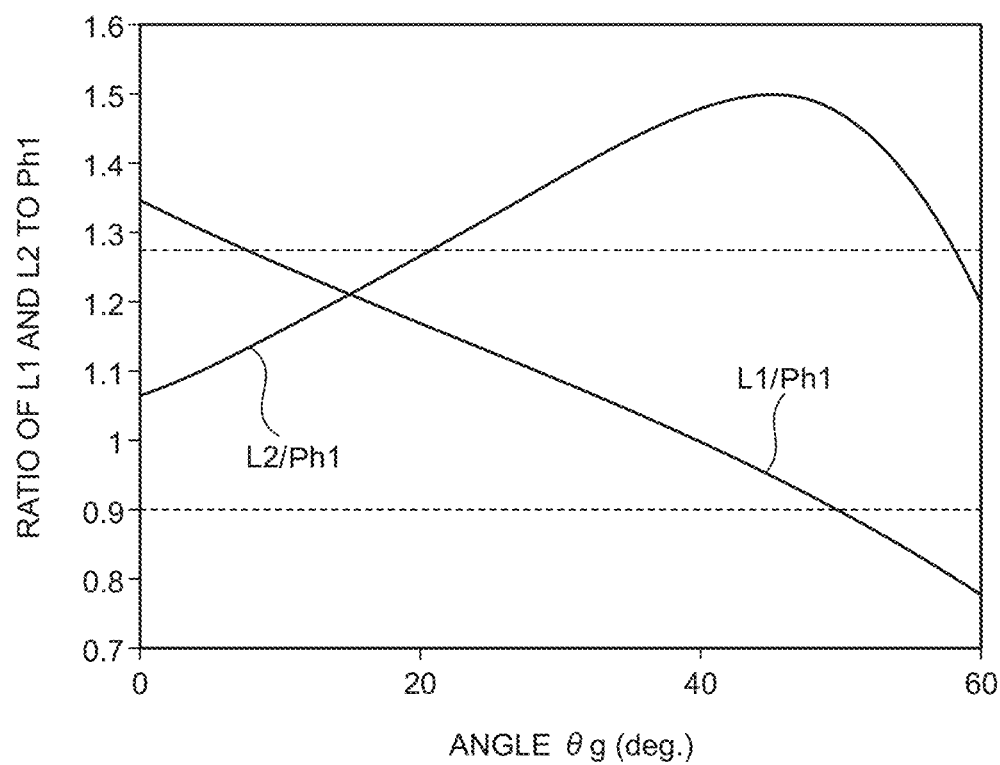
FIG. 24 is an explanatory diagram illustrating the relations of the ratios of the same color pixel intervals to the reference distance in the second direction between the pixels with the inclination of the scan lines in a fourth embodiment.

FIG. 24 is an explanatory diagram illustrating the relations of the ratios of the same color pixel intervals to the reference distance in the second direction between the pixels with the inclination of the scan lines in a fourth embodiment. In the third embodiment, in FIG. 22, the pixel arrangement has been described in which the distance Pw2 is 3/2 times the distance Pw1 illustrated in FIG. 9 and the distance Ph2 is ⅔ times the distance Ph1 illustrated in FIG. 9. The fourth embodiment differs from the third embodiment in that the length of the distance Ph2 described in the third embodiment is different. The following describes the pixel arrangement of the fourth embodiment with reference to FIGS. 21, 22, and 24. The same components as those described in any of the first to the third embodiments are denoted with the same reference numerals, and the descriptions thereof are omitted.

Also in the fourth embodiment, as illustrated in FIG. 22, the length in the direction Vx of each of the pixels PixR, PixG, and PixB in the pixel arrangement is the distance Pw2; and the length in the direction Vy of each of the pixels PixR, PixG, and PixB is the distance Ph2. In the fourth embodiment, the distance Pw2 illustrated in FIG. 22 is 3/2 times the distance Pw1 illustrated in FIG. 9, and the distance Ph2 illustrated in FIG. 22 is the same as the distance Ph1 illustrated in FIG. 9. The arrangement of the pixels PixR, PixG, and PixB as illustrated in FIG. 21 allows sufficient distance Pw2, thereby improving the aperture ratio of each of the pixels PixR, PixG, and PixB.

As illustrated in FIG. 24, the interval L1/Ph1 and the interval L2/Ph1 between the pixels of the same color change with the angle θg. For the pixel size of the fourth embodiment, when θg=0 degrees, the interval L1/Ph1 has a large value of 1.34. It is thus important to reduce L1/Ph1 so that the oblique lines due to the screen-door effect are not visually recognized.

When the interval L1/Ph1 is 1.275 or smaller, which is smaller by 5% than 1.34 obtained when θg=0, and the interval L1/Ph1 is 0.9 or larger, the screen-door effect is reduced. As a result, the user is less likely to visually recognize the oblique line pattern.

Therefore, in the display device of the fourth embodiment, when the angle θg is from 7.45 to 49.72 degrees, L1 is from 1.275 to 0.9. As a result, the screen-door effect decreases.

While the preferred embodiments have been described above, the present disclosure is not limited to such embodiments. The contents disclosed in the embodiments are merely examples, and can be variously modified within the scope not departing from the gist of the present disclosure. Any modifications appropriately made within the scope not departing from the gist of the present disclosure also naturally belong to the technical scope of the present disclosure.

For example, the common electrode CE includes the common electrode CE1 and the common electrode CE2, but may include only the common electrode CE1 or the common electrode CE2. The pixel electrode PE includes the pixel electrode PE1 and the pixel electrode PE2, but may include only the pixel electrode PE1 or the pixel electrode PE2.

What is claimed is:
1. A display device comprising:
    a substrate;
    a display region that has a shape of a polygon with five or more sides, is provided to the substrate, and is provided with a plurality of pixels, a plurality of scan lines extending in a first direction, and a plurality of signal lines extending in a second direction;
    a peripheral region that is provided to the substrate and located between ends of the substrate and the display region;

a first scan line drive circuit that is disposed in the peripheral region and coupled to the first scan lines including second scan lines and third scan lines;

a second scan line drive circuit that is disposed in the peripheral region opposite the first scan line drive circuit with the display region therebetween, and coupled to the second scan lines that are some of the first scan lines;

a third scan line drive circuit that is disposed in the peripheral region opposite the first scan line drive circuit across the display region, and coupled to the third scan lines that are the first scan lines other than the second scan lines;

a signal line coupling circuit that is disposed in the peripheral region and coupled to the signal lines; and a driver integrated circuit (IC) that is disposed in the peripheral region and configured to control the first scan line drive circuit, the second scan line drive circuit, the third scan line drive circuit, and the signal line coupling circuit, wherein the second scan line drive circuit and the third scan line drive circuit are adjacent to each other, one or more of the second scan lines passes through the third scan line drive circuit and extends to the display region, a switching element of the pixel includes:
  a semiconductor layer;
  a first gate electrode disposed in a lower layer with respect to the semiconductor layer; and
  a second gate electrode disposed in an upper layer with respect to the semiconductor layer, and the one or more of the second scan lines passing through the third scan line drive circuit is in the same layer as the first gate electrode.

2. The display device according to claim 1, wherein the first direction is non-parallel and non-orthogonal to a direction orthogonal to the second direction.

3. The display device according to claim 2, wherein
the pixels include first pixels to display a first color, second pixels to display a second color different from the first color, and third pixels to display a third color different from the first color and the second color,
the first direction is a direction along an arrangement direction of first reference positions in the first pixels coupled to one of the first scan lines, and
the second direction is a direction along an arrangement direction of second reference positions in the first pixels coupled to one of the signal lines.

4. The display device according to claim 2, wherein
the pixels include first pixels to display a first color, second pixels to display a second color different from the first color, and third pixels to display a third color different from the first color and the second color,
the first pixels are continuously arranged in the second direction,
the second pixels are continuously arranged in the second direction,
the third pixels are continuously arranged in the second direction, and
one of the first pixels and another of the first pixels arranged next to the one of the first pixels in the first direction are arranged so as to be offset from each other by half a length of the first pixel in the second direction.

5. The display device according to claim 2, wherein
the pixels include first pixels to display a first color, second pixels to display a second color different from the first color, and third pixels to display a third color different from the first color and the second color,
each first pixel is disposed between one of the second pixels and one of the third pixels in the first direction and is disposed between one of the second pixels and one of the third pixels in the second direction,
each second pixel is disposed between one of the first pixels and one of the third pixels in the first direction and is disposed between one of the first pixels and one of the third pixels in the second direction,
each third pixel is disposed between one of the second pixels and one of the first pixels in the first direction and is disposed between one of the second pixels and one of the first pixels in the second direction,
the first pixels are arranged in a third direction that intersects both the first direction and the second direction,
the second pixels are arranged in the third direction, and
the third pixels are arranged in the third direction.

6. The display device according to claim 1, wherein the third scan lines are in the same layer as the second gate electrode.

7. A display system comprising:
a lens;
the display device according to claim 1; and
a control device that outputs an image to the display device.

8. A display device comprising:
a substrate;
a display region that has a shape of a polygon with five or more sides, is provided to the substrate, and is provided with a plurality of pixels, a plurality of first scan lines extending in a first direction, and a plurality of signal lines extending in a second direction;
a peripheral region that is provided to the substrate and located between ends of the substrate and the display region;
a first scan line drive circuit that is disposed in the peripheral region and coupled to the first scan lines including second scan lines and third scan lines;
a second scan line drive circuit that is disposed in the peripheral region opposite the first scan line drive circuit with the display region therebetween, and coupled to the second scan lines that are some of the first scan lines;
a third scan line drive circuit that is disposed in the peripheral region opposite the first scan line drive circuit across the display region, and coupled to the third scan lines that are the first scan lines other than the second scan lines;
a signal line coupling circuit that is disposed in the peripheral region and coupled to the signal lines; and
a driver integrated circuit (IC) that is disposed in the peripheral region and configured to control the first scan line drive circuit, the second scan line drive circuit, the third scan line drive circuit, and the signal line coupling circuit, wherein
the second scan line drive circuit and the third scan line drive circuit are adjacent to each other,
one or more of the second scan lines passes through the third scan line drive circuit and extends to the display region,
a switching element of the pixel includes:
  a semiconductor layer;
  a first gate electrode disposed in a lower layer with respect to the semiconductor layer; and a second gate electrode disposed in an upper layer with respect to the semiconductor layer,
the signal line coupling circuit is coupled to a first coupling wiring line and a second coupling wiring line,
the first coupling wiring line consists of only a first wiring layer formed in the same layer as the signal line and is a part of the signal line,
the second coupling wiring line consists of at least a second wiring layer formed in the same layer as the second gate electrode and the first wiring layer, and is a part of the signal line, and
the second coupling wiring line has a smaller width than a width of the first coupling wiring line.

9. The display device according to claim 8, wherein the first direction is non-parallel and non-orthogonal to a direction orthogonal to the second direction.

10. The display device according to claim 9, wherein
the pixels include first pixels to display a first color, second pixels to display a second color different from the first color, and third pixels to display a third color different from the first color and the second color,
the first direction is a direction along an arrangement direction of first reference positions in the first pixels coupled to one of the first scan lines, and
the second direction is a direction along an arrangement direction of second reference positions in the first pixels coupled to one of the signal lines.

11. The display device according to claim 9, wherein
the pixels include first pixels to display a first color, second pixels to display a second color different from the first color, and third pixels to display a third color different from the first color and the second color,
the first pixels are continuously arranged in the second direction,
the second pixels are continuously arranged in the second direction,
the third pixels are continuously arranged in the second direction, and
one of the first pixels and another of the first pixels arranged next to the one of the first pixels in the first direction are arranged so as to be offset from each other by half a length of the first pixel in the second direction.

12. The display device according to claim 9, wherein
the pixels include first pixels to display a first color, second pixels to display a second color different from the first color, and third pixels to display a third color different from the first color and the second color,
each first pixel is disposed between one of the second pixels and one of the third pixels in the first direction and is disposed between one of the second pixels and one of the third pixels in the second direction,
each second pixel is disposed between one of the first pixels and one of the third pixels in the first direction and is disposed between one of the first pixels and one of the third pixels in the second direction,
each third pixel is disposed between one of the second pixels and one of the first pixels in the first direction and is disposed between one of the second pixels and one of the first pixels in the second direction,
the first pixels are arranged in a third direction that intersects both the first direction and the second direction,
the second pixels are arranged in the third direction, and
the third pixels are arranged in the third direction.

13. A display system comprising:
a lens;
the display device according to claim 8; and
a control device that outputs an image to the display device.

14. A display device comprising:
a substrate;
a display region that has a shape of a polygon with five or more sides, is provided to the substrate, and is provided with a plurality of pixels, a plurality of first scan lines extending in a first direction, and a plurality of signal lines extending in a second direction;
a peripheral region that is provided to the substrate and located between ends of the substrate and the display region;
a first scan line drive circuit that is disposed in the peripheral region and coupled to the first scan lines including second scan lines and third scan lines;
a second scan line drive circuit that is disposed in the peripheral region opposite the first scan line drive circuit with the display region therebetween, and coupled to the second scan lines that are some of the first scan lines;
a third scan line drive circuit that is disposed in the peripheral region opposite the first scan line drive circuit across the display region, and coupled to the third scan lines that are the first scan lines other than the second scan lines;
a signal line coupling circuit that is disposed in the peripheral region and coupled to the signal lines; and
a driver integrated circuit (IC) that is disposed in the peripheral region and configured to control the first scan line drive circuit, the second scan line drive circuit, the third scan line drive circuit, and the signal line coupling circuit, wherein
the second scan line drive circuit and the third scan line drive circuit are adjacent to each other,
one or more of the second scan lines passes through the third scan line drive circuit and extends to the display region,
the signal line coupling circuit includes:
a first signal line coupling circuit; and
a second signal line coupling circuit that is disposed at a location different from a location of the first signal coupling circuit,
a longitudinal direction of the first signal coupling circuit differs from a longitudinal direction of the second signal coupling circuit,
the longitudinal direction of the second signal line coupling circuit is along one side of the display region, and
the one or more of the second scan lines passes through the second signal line coupling circuit and extends to the display region.

15. The display device according to claim 14, wherein the first direction is non-parallel and non-orthogonal to a direction orthogonal to the second direction.

16. The display device according to claim 15, wherein
The pixels include first pixels to display a first color, second pixels to display a second color different from the first color, and third pixels to display a third color different from the first color and the second color,
the first direction is a direction along an arrangement direction of first reference positions in the first pixels coupled to one of the first scan lines, and
the second direction is a direction along an arrangement direction of second reference positions in the first pixels coupled to one of the signal lines.

17. The display device according to claim 15, wherein
the pixels include first pixels to display a first color, second pixels to display a second color different from the first color, and third pixels to display a third color different from the first color and the second color, the first pixels are continuously arranged in the second direction, the second pixels are continuously arranged in the second direction, the third pixels are continuously arranged in the second direction, and one of the first pixels and another of the first pixels arranged next to the one of the first pixels in the first direction are arranged so as to be offset from each other by half a length of the first pixel in the second direction.

18. The display device according to claim 15, wherein the pixels include first pixels to display a first color, second pixels to display a second color different from the first color, and third pixels to display a third color different from the first color and the second color, each first pixel is disposed between one of the second pixels and one of the third pixels in the first direction and is disposed between one of the second pixels and one of the third pixels in the second direction, each second pixel is disposed between one of the first pixels and one of the third pixels in the first direction and is disposed between one of the first pixels and one of the third pixels in the second direction, each third pixel is disposed between one of the second pixels and one of the first pixels in the first direction and is disposed between one of the second pixels and one of the first pixels in the second direction, the first pixels are arranged in a third direction that intersects both the first direction and the second direction, the second pixels are arranged in the third direction, and the third pixels are arranged in the third direction.

19. A display system comprising:

a lens;

the display device according to claim 14; and a control device that outputs an image to the display device.

* * * * *